(12) United States Patent
Fish et al.

(10) Patent No.: US 7,185,317 B2
(45) Date of Patent: Feb. 27, 2007

(54) LOGICAL DATA MODELING AND INTEGRATED APPLICATION FRAMEWORK

(75) Inventors: John D. Fish, River Forest, IL (US);
Benjamin R. Wolf, Chicago, IL (US);
Amy M. Gilchrist, Chicago, IL (US);
Michael D. Wolf, Chicago, IL (US);
Daniel A. Hartley, Chicago, IL (US);
Matthew C. Dorn, Holland, MI (US)

(73) Assignee: Hubbard & Wells, Chicago, IL (US)

( * ) Notice: Subject to any disclaimer, the term of this patent is extended or adjusted under 35 U.S.C. 154(b) by 655 days.

(21) Appl. No.: 10/126,286

(22) Filed: Apr. 19, 2002

(65) Prior Publication Data

US 2003/0154191 A1    Aug. 14, 2003

Related U.S. Application Data

(60) Provisional application No. 60/357,293, filed on Feb. 14, 2002.

(51) Int. Cl.
*G06F 9/44* (2006.01)
(52) U.S. Cl. .................................................. 717/121
(58) Field of Classification Search ........ 717/100–108, 717/120–121; 707/102, 101; 715/826, 501.1; 709/203
See application file for complete search history.

(56) References Cited

U.S. PATENT DOCUMENTS 5,495,567 A * 2/1996 Iizawa et al. ............... 715/762
5,611,076 A * 3/1997 Durflinger et al. .......... 707/102
5,734,887 A * 3/1998 Kingberg et al. ............... 707/4
6,490,590 B1 * 12/2002 Fink ........................... 707/100
6,633,878 B1 * 10/2003 Underwood ................ 707/100
6,662,357 B1 * 12/2003 Bowman-Amuah ......... 717/120

OTHER PUBLICATIONS

Zhu et al. "An Object-Oriented Data Framework for Virtual Environments with Hierarchical Modeling", Jan. 1995, ACM SIGSOFT, Software Engineering Notes vol. 24 No. 1, pp. 65-68.*

* cited by examiner

*Primary Examiner*—Wei Zhen
*Assistant Examiner*—Anna Deng
(74) *Attorney, Agent, or Firm*—Blakely, Sokoloff, Taylor & Zafman, LLP

(57) ABSTRACT

A logical data model is defined using a data-modeling framework. The data-modeling framework enables a user to define the logical data model using a series of graphical user interfaces (GUI) or an application-programming interface (API). The data-modeling framework dynamically translates the logical data model into a corresponding physical data model. The logical data model can be changed using the GUI or API and the physical data model is automatically adjusted to accommodate the changes to the logical data model. The logical data model extends capabilities of the physical data model and automatically allows these capabilities to be available to software developers using an application framework integrated with the data-modeling framework. The application framework enables the developer to configure various application features and data management operations using GUI or API. The application framework is tightly coupled with the data-modeling framework such that changes in the logical data model is automatically reflected in the applications.

44 Claims, 40 Drawing Sheets

February 12, 2006

↰ Information Model

→ User Defined Types
→ External Sets

| Home | Queries | Zones | Users and Groups | Log Out |

Location: <u>Information Model</u> > Sets

— 210

230 — 220 — Add a New Set — 215
225

| Set | Data | Edit | Delete |
|---|---|---|---|
| Addresses | data | edit | del |
| Attorneys | data | edit | del |
| Career Event Types | data | edit | del |
| Career Events | data | edit | del |
| Careers | data | edit | del |
| Careers Content | data | edit | del |
| Case Studies | data | edit | del |
| Client Service Groups | data | edit | del |
| Contacts | data | edit | del |
| Content Type | data | edit | del |
| Courts | data | edit | del |
| Deals and Matters | data | edit | del |
| Degrees | data | edit | del |
| Departments | data | edit | del |
| Employees | data | edit | del |
| Event Types | data | edit | del |
| Events | data | edit | del |
| Firm Content | data | edit | del |
| Firm Information | data | edit | del |

← Information Model

→ User Defined Types
→ External Sets

| Home | Queries | Zones | Users and Groups | Log Out |

Location: Information Model > Sets > Set Summary

| Name | |
|---|---|
| News — 248 | Edit |

| Attribute | Data Type | Size | Edit | Delete |
|---|---|---|---|---|
| H4AssetID — 250 | | | edit | cannot delete |
| H4ID — 252 | | | | cannot delete |

Add New Attribute — 254

| Relationship | Related Set | Edit | Delete |
|---|---|---|---|

Add New Relationship — 256

| February 12, 2006 | Home | Queries | Zones | Users and Groups | Log Out |

← Information Model

→ User Defined Types
→ External Sets

Location: Information Model > Sets > Set Summary > Add Attribute

Base Set: News —— 262

Attribute Name: [Title of Article] —— 264

Data Type: [Alphanumeric ▼] —— 266

Size: [200] —— 268

[Submit] —— 270

← Information Model
↑ User Defined Types
↑ External Sets

| Home | Queries | Zones | Users and Groups | Log Out |

Location: Information Model > Sets > Set Summary

| Name | | Edit |
|---|---|---|
| News — 262 | | edit |

Add New Attribute

| Attribute | Data Type | Size | Edit | Delete |
|---|---|---|---|---|
| H4AssetID — 281 | | | | cannot delete |
| H4ID — 282 | | | | cannot delete |
| Title of Article — 274 | Alphanumeric — 276 | 200 — 278 | edit — 284 | del — 280 |

Add New Relationship

| Relationship | Related Set | Edit | Delete |
|---|---|---|---|

| February 12, 2006 | Home | Queries | Zones | Users and Groups | Log Out |
|---|---|---|---|---|---|

← Information Model

→ User Defined Types

→ External Sets

Location: Information Model > Sets > View Data

Set: News — 402

| H4ID | Abstract | BGA Type | Body Text | Color | File Upload | News Display Data | News ID | News ID Tracker |
|---|---|---|---|---|---|---|---|---|
| 3 | | | | | | 9/18/2001 | | |
| 4 | | | | | | 9/18/2001 | | |
| 5 | This is sample text to be used in the content manager text editor. This will provide the' necessary information to be used as | | This is sample text to be used in the content manager text editor. This will provide the' necessary information to be used as | | | 10/18/2001 | | |

1-20 21-40 41-60 61-80 81-100 more Total Records: 839 — 404

- Information Model
- External Sets

| Home | Queries | Zones | Users and Groups | Log Out |

Location: Information Model > External Sets > Data Source Admin > Add Data Source

Data Source Name: HR Database — 502

Connection String: DRIVER={SQL SERVER};SERVER=CHPRODDB4\DEV;UID=sa;PASSWORD=;DATABASE=TestDB;DSN=; — 504

Submit

- Information Model
- External Sets
- Data Source Admin

| Home | Queries | Zones | Users and Groups | Log Out |

Location: Information Model > External Sets > Add External Set

External Set

Set Name: HR Information — 506

Data Source: HR Database — 508

Submit

| | | | | |
|---|---|---|---|---|
| Home | Queries | Zones | Users and Groups | Log Out |

Location: Information Model > External Sets > Add External Set > Select Source Table

Set: HR Information

| Source Table —— 510 | Select |
|---|---|
| Area_Industries | ○ |
| Areas | ○ |
| Attorney_Areas | ○ |
| Attorney_Groups | ○ |
| AttorneyInfo | ⦿ —511 |
| Departments | ○ |
| dtproperties | ○ |
| Employees | ○ |
| EventArea | ○ |
| EventGroup | ○ |
| EventOffice | ○ |
| Events | ○ |
| EventSchool | ○ |
| EventTypes | ○ |

February 12, 2006

← Information Model
→ Sets
→ Data Source Admin

FIG. 5C

| | | February 12, 2006 | | | | | | | | |
|---|---|---|---|---|---|---|---|---|---|---|
| | | ← Information Model | | | Home | Queries | Zones | Users and Groups | Log Out | |
| | | → Sets | | | Location: Information Model > External Sets > Add External Set >Select Source Table > Select External Attributes | | | | | |
| | | → Data Source Admin | | | Set: HR Information | | | | | |
| | | | | | Table: AttorneyInfo | | | | | |
| | | | | | | ⌐512 | ⌐514 | ⌐516 | ⌐518 | |
| | | | | | Add | Primary Key | Field Name | Field Label | Data Type | Field Size |
| | | | | | ☑ | ☑ | EmployeeID | EmployeeID | Unicode Alphanumer ▶ | 50 |
| | | | | | ☑ | ☐ | Level1 | Level1 | Unicode Alphanumer ▶ | 50 |
| | | | | | ☑ | ☐ | UnderSchool | UnderSchool | Unicode Alphanumer ▶ | 100 |
| | | | | | ☑ | ☐ | UnderDegree | UnderDegree | Unicode Alphanumer ▶ | 50 |
| | | | | | ☑ | ☐ | UnderYear | UnderYear | Unicode Alphanumer ▶ | 20 |
| | | | | | ☑ | ☐ | UnderHonors | UnderHonors | Long Text ▶ | 2147483647 |
| | | | | | ☑ | ☐ | UnderMemo | UnderMemo | Long Text ▶ | 2147483647 |
| | | | | | ☑ | ☐ | GradSchool | GradSchool | Unicode Alphanumer ▶ | 100 |
| | | | | | ☑ | ☐ | GradDegree | GradDegree | Unicode Alphanumer ▶ | 50 |

| Home | Queries | Zones | Users and Groups | Log Out |

Location: Information Model > Sets > Set Summary

← Information Model

→ User Defined Types

→ External Sets

| Name | | | Edit |
|---|---|---|---|
| Person —— 640 | | | edit |

Add New Attribute

| Attribute | Data Type | Size | Edit | Delete |
|---|---|---|---|---|
| H4AssetID | | | cannot delete | |
| H4ID | | | cannot delete | |
| First Name | Alphanumeric | 255 | edit | del |
| Last Name | Alphanumeric | 255 | edit | del |
| Office ID | Alphanumeric | 5 | edit | del |
| Social Security Number | Integer | N/A | edit | del |

Add New Relationship —— 646

| Relationship —— 642 | Related Set —— 644 | Edit | Delete |
|---|---|---|---|
| Practice Area | Practice Area Order | edit | del |
| Industries | Industries | edit | del |
| Articles Authored | News | edit | del |
| Main Office | Office | edit | del |

| Home | Queries | Zones | Users and Groups | Log Out |

Location: Information Model > Sets > User Defined Types > User Defined Type Summary > Member ← Information Model
← Sets

Type (Delete): Employee Status —— 705

Member Name: [ Active ] —— 710

Description: [ This is for all currently employed full-time personnel. ◄ ► ] —— 715

Decode (2-5 chars): [ Activ ] —— 720

[ Submit ]

| February 12, 2006 | Home | Queries | Zones | Users and Groups | Log Out |
|---|---|---|---|---|---|
| ← Information Model | | | | | |
| ← Sets | | | | | |

Location: Information Model > Sets > User Defined Types > User Defined Type Summary

| Name | | Edit |
|---|---|---|
| Employee Status —725 | | edit |

Add New Member

| Member —730 | Edit | Delete |
|---|---|---|
| Active | edit | del |
| Contractor | edit | del |
| Ex-employee | edit | del |
| Leave of Absense | edit | del |
| Part-time | edit | del |

FIG. 7B

LOGICAL DATA MODELING AND INTEGRATED APPLICATION FRAMEWORK

RELATED APPLICATION

This application claims priority to a U.S. Provisional Patent Application having Ser. No. 60/357293, filed on Feb. 14, 2002 and incorporated herein by reference.

COPYRIGHT NOTICE

Contained herein is material that is subject to copyright protection. The copyright owner has no objection to the facsimile reproduction by anyone of the patent document or the patent disclosure, as it appears in the United States Patent and Trademark Office patent file or records, but otherwise reserves all rights to the copyright whatsoever. The following notice applies to the software, screenshots and data as described below and in the drawings hereto: Copyright © 2002, Hubbard One, Inc., All Rights Reserved.

FIELD OF THE INVENTION

The present invention relates to a computer system configured to allow software users to structure, access and manage information for use in software applications.

BACKGROUND

Since the mid-1990s, web applications have become among the principal means of communication between a business and its customers, employees and partners. More generally, distributed applications of all kinds, including web applications, are used by businesses to communicate, transact and manage information.

Distributed applications have three main layers: the data layer, the application layer, and the presentation layer. The data layer contains two main types of data: the business content, and the supporting data required by the applications.

The current application development process is as follows. Applications must first be carefully planned and designed. Then, a database model for the application must be designed. After the database is fully designed, the physical database is constructed. Then, the application is programmed to access information from the database, process and manage the data, and present the results to the user. The application may also request input from the user, process and manage the data, and insert data into the database.

Despite the importance and popularity of distributed applications, application development has remained a largely non-automated, technical, risk-prone, and costly business process. This is in part because it is difficult to design and maintain large-scale applications, especially as the data model changes over time.

A data model is the product of the database design process that aims to identify and organize the required data logically and physically. A physical data model describes what information is to be contained in a database and how the items in the database will be related to each other. A properly designed physical data model will structure the data in a way that accurately reflects actual meaning of the data and its relationships. It requires great skill, technical and business insight, and disciplined use of good form to build a good physical data model for a software application.

There are various data modeling tools available to assist developers with the data modeling process, however, these tools are not typically utilized once the data model design is complete. That is, software applications written to access the database are executed independently of the data modeling tools because the applications are interacting directly with the physical database.

Physical data models are therefore difficult to change once the database is configured, and especially once the application data has been inserted into the database. Consequently, in complex systems, compromises are often made to allow the data model to remain unchanged or to change in a way that is easier but not optimal. For example, it is often more convenient to leave data labels unchanged even when the contents to be described by those labels have changed. This leads to confusion or errors for users not familiar with the original data model design.

Because of the difficulty in creating a well-designed physical data model, and because of the sub-optimal nature of the way data models are changed over time, physical data models often do not properly or intuitively reflect the intended meaning of the data they contain.

Furthermore, physical data models are limited in the concepts that they inherently support. For example, relationships between two pieces of data are represented by a physical join type (e.g., one-to-many) but not by a meaningful relationship label (e.g., "Authors" where a relationship between people and publications is established.). Also, it can be cumbersome and non-intuitive to navigate a physical data model in order to write the code required to insert and retrieve data from the database.

Importantly, software applications are designed to interoperate with a physical database (e.g., SQL Server, Oracle). If the database changes, the applications must be manually updated to accommodate the change. Applications, like the databases they rely on, are hard to maintain over time. For example, applications that utilize relational databases often use the SQL query language to exchange information with the data layer. As the database is modified, the SQL must also be modified to accommodate the changes. After changes are made, the application must also be carefully also re-tested, which is a time-consuming process.

Similarly, if the applications change, the underlying database often requires adjustment. This is true because neither the database nor the application has any "awareness" of the other; the layers operate independently.

Another area of inefficiency in the application development process is the re-development of common components that occurs because of the difficulty of code re-use. Many business applications share common concepts such as workflow, security, and content management screens. But because applications rely on the physical database, and the physical databases vary in structure, application concepts must be largely or completely rewritten for each application. For example, security is a general concept that may refer to having the application provide access on the basis of user groups or conditions. Exactly how security will be implemented from application to application can vary dramatically. The database (e.g., SQL Sever, Oracle) may provide a security framework, but the developer must extend that framework into the application layer, and ultimately to the presentation layer. Therefore, much time and effort is spent redeveloping and implementing features that are common to many applications. Even within an organization or small development teams, it is difficult to reuse application code because the specific configuration of the physical data model requires that the application code be adjusted as the code is implemented.

A web application, or most any distributed application development process, depends on a well-maintained data model. But because both applications and physical data models are hard to maintain, data models are often suboptimal and applications are often left unchanged when the change is needed. Also, because the application development process interacts with the physical database, the process is complicated, prone to error and inefficient.

Accordingly, what is needed is a modeling and application framework that simplifies application management over time, provides for a high degree of re-usability, reduces the chance for developer error and generally does not suffer from the limitations of previous software tools.

SUMMARY OF THE INVENTION

Although the best understanding of the present invention will be had from a through reading of the specification and claims presented below, this summary is provided in order to acquaint the reader with some of the new and useful features of the present invention. Of course, this summary is not intended to be a complete litany of all of the features of the present invention, nor is it intended in any way to limit the breadth of the claims, which are presented at the end of the detailed description of this application.

In one embodiment, a system is disclosed for providing application access to a database through an integrated framework for dynamic data modeling and application development. The system provides a logical data model that first extends the capabilities of the physical data model and then automatically translates, optimizes and manages the physical representation of the logical model. And because the application framework is integrated with the logical data model, once the user configures the logical data model, the features of the application framework become automatically available to the developer.

The data-modeling framework enables a user to define a logical data model using a series of graphical user interfaces (GUI) or an application-programming interface (API). The logical data model provides functionality that physical databases do not provide. The data-modeling framework dynamically translates the logical data model into a corresponding physical data model. Users utilize the GUI or the API to modify the logical data model, and the system automatically adjusts the physical data model to accommodate the changes to the logical data model. The system shields both the software developer and the software application from complexities and limitations of the physical databases. Furthermore, the developer and the software applications that make use of the data are not limited or restricted to any particular physical data store or physical database.

The application framework that is integrated with the data-modeling framework enables a user to configure various application features and data management operations using a series of graphical user interfaces (GUI) or an application programming interface (API). Through the API, software applications can interact with the application framework, which in turn interacts with the logical data model (or data modeling framework).

Because the application framework is integrated with the data-modeling framework, the application framework features are automatically available to the user, even as the data model is changed over time. For example, the system can provide data entry screens for application content entry; as the data model changes, the content screens are automatically updated. The application framework, including the data management functions (e.g., workflow, history) and application features (e.g., content entry screens, integrated navigation system), is designed to be extensible. Users can develop additional application features and data management functions and have them interoperate with the system through the API.

Other features of the present invention will be apparent from the accompanying drawings and from the detailed description that follows.

BRIEF DESCRIPTION OF THE DRAWINGS

The accompanying drawings disclose various embodiments of the present invention for purposes of illustration only and are not intended to limit the scope of the invention.

FIG. 2A illustrates an example of a graphical interface listing sets defined in the information model.

FIG. 2C illustrates an example of a set summary graphical interface.

FIG. 2D illustrates an example of a graphical interface used to add new attributes to a set.

FIG. 2E illustrates an example of a graphical interface presented to the user after the attribute is defined using the interface shown in FIG. 2D.

FIG. 4 illustrates an example of a graphical interface used to display content of a set.

FIG. 5A illustrates an example of a graphical interface used by the user to define a new external data source.

FIG. 5B illustrates an example of a graphical interface used by the user to define external sets in the external data source.

FIG. 5C illustrates an example of a graphical interface presented to the user listings tables and views available from the external data source.

FIG. 5D illustrates an example of a graphical interface presented to the user listings fields in a table selected from the external data source.

FIG. 5E illustrates an example of a graphical interface used by the user to configure the batch synchronization process of the external data .

FIG. 6A illustrates an example of a graphical interface used to define a managed relationship.

FIG. 6C illustrates an example of a graphical interface displaying information about a set including its attributes and related sets.

FIG. 6C is a flow diagram illustrating an example of a relationship definition process in accordance to one embodiment of the invention.

FIG. 7A illustrates an example of a member definition interface used to add members to a custom data type.

FIG. 7B illustrates an example of an interface showing members in a custom data type.

DETAILED DESCRIPTION

Figure 1A:
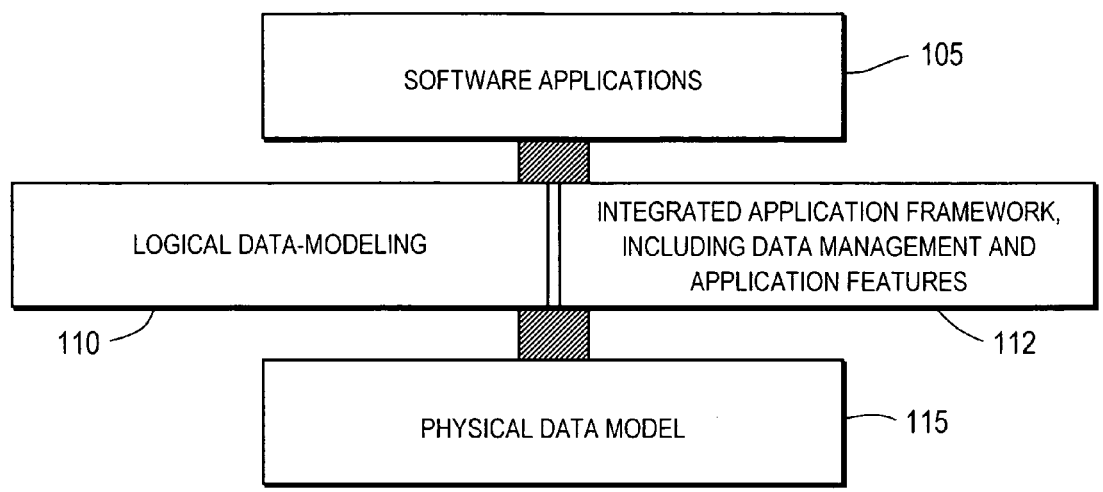
FIG. 1A is a block diagram illustrating an example of a system employing the data-modeling framework and the application framework in accordance with one embodiment of the invention.

Described herein is a system for providing application access to a database through a data-modeling and application framework. In one embodiment, a logical data model is defined using a series of graphical user interfaces (GUI) presented by the data-modeling framework. The data-modeling framework dynamically translates the logical data model into a physical data model. The data-modeling and application framework include functionalities that enhance features of the physical data model and dynamically translate changes to the physical data model as changes to the logical data model are made.

In the following description, for purposes of explanation, numerous specific details are set forth in order to provide a thorough understanding of the present invention. It will be evident, however, to one skilled in the art that the present invention may be practiced without these specific details. In other instances, well-known structures, processes and devices are shown in block diagram form or are referred to in a summary manner in order to provide an explanation without undue detail.

Some portions of the detailed description that follow are presented in terms of algorithms and symbolic representations of operations on data within a computer memory. These algorithmic descriptions and representations (e.g., in the form of flow charts) are the means used by those skilled in the computer science arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared and otherwise manipulated. It has proven convenient at times, principally for reasons of common usage, to refer to these signals as bits, values, elements, symbols, characters, terms, numbers or the like. It should be borne in mind, however, that all of these and similar terms are to be associated with the appropriate physical quantities and are merely convenient labels applied to these quantities. Unless specifically stated otherwise, it will be appreciated that throughout the description of the present invention, use of terms such as "processing", "computing", "calculating", "determining", "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

I. Introduction

Before discussing the various details that make up an exemplary embodiment of the present invention, it is helpful to provide an overview of the system that makes up the present application framework for web-based and other software applications. As will become evident upon review of this specification, the present invention provides both a data modeling environment that helps software developers structure and manage information for use in business applications, and an application framework that provides tools developers need to build applications on that information. The present invention thus acts as the "engine" that powers web sites, intranets or in fact any distributed application.

To accomplish these objectives, the present invention combines a dynamic data modeling system and a high-level application framework. The data modeling features provide the tools needed to structure and manage data for use in business applications. Developers can interact with intuitive GUIs for the logical representation of the data model, called the information model. As the information model changes, the present system adjusts the corresponding physical data model accordingly. This separation of the data model into logical and physical layers combines the advantages of traditional relational database design, including performance, flexibility, and data normalization, with the speed, manageability, and ease-of-use of higher level content management systems. It also frees developers from any particular physical data store and allows them to build real, data-driven applications (that can be migrated from one data store to another) from a true relational data model.

The application framework aspect of the present invention provides high-value tools to help developers access, process and present data and manage the user experience. Because the application framework is integrated with the information model, the application tools adjust as the data model adjusts, dramatically reducing the maintenance effort as compared with traditional development approaches.

The combination of a dynamic data modeling system and high-level application framework provided by the present invention allows an organization to tie multiple and disparate applications together, and then extend the data and application functionality where the others leave off. The present invention can thus be used build complete and, stand-alone applications, or it can be used in conjunction with existing systems. In either scenario, the features provided by the present invention free developers from having to spend their time on low-value, maintenance-oriented tasks such as content administration, data integration and history tracking, because the present system handles these (and other) tasks automatically. This allows developers to concentrate on application development.

From the above it should be apparent that the present invention is very different from prior application frameworks in several ways. First, the present invention integrates dynamic data management with application development tools. Second, the present invention operates at a higher level, providing most features in an intuitive graphical interface, but always giving the developer pure API access. Third, the focus of the present invention is on rapid development and simplified management of information-rich business applications.

Although the present system and prior content management systems share many features like: document management, workflow, history logging, security framework, and automatic forms creation; those prior content management systems work primarily with unstructured content, layering on metadata, and allowing users to interact in a publishing model. The present system, on the other hand, follows a data driven approach; storing data in a true relational database format. Any "meta data" in the present system is itself part of the structured content that will make up the application. Thus, the present system is an ideal tool to manage content rich applications like Web sites and intranet application. With this overview in mind then, we now turn to the details of an exemplary embodiment of the present invention.

II. A Logical Data Modeling & Integrated Application Framework

FIG. 1A is a block diagram illustrating an example of a system employing the data-modeling framework and the data-management framework in accordance with one embodiment of the invention. The system includes a data-modeling framework 110 for logical data-modeling and an application framework 112 to allow developers to manage the physical database while taking advantages of features provided by the data-modeling framework 110. The data modeling framework 110 and the application framework 112 together provide the developers an integrated framework for database application development. For example, a software developer uses the data modeling framework 110 to develop a logical data model, which is dynamically translated by the data modeling framework 110 into a physical data model 115. The application framework 112 provides features, in conjunction with the data modeling framework 110, to provide enhanced representation of information in the physical data model 115. These features are available to the software developer and include, for example, content management features, navigation features, etc. The software developer and software applications 105 can take advantage of these additional features by interacting with the application framework 112. The application framework 112 in turn interacts with the physical data model 115.

The integrated system of the data modeling framework 110 and the application framework 112 may be accessible from a workstation using a local or a remote network connection and a web browser (e.g., Internet Explorer). The physical data model 115 may be implemented using a variety of data stores, including relational and non-relational data stores. For the purposes of this illustration, the term database and data store are used interchangeably. The figures though describe a relational database implementation that could include, for example, Microsoft SQL Server 2000. The system may employ development tools such as, for example, Component Object Model (COM), Distributed COM (DCOM), Component Object Model Plus (COM+), Open DataBase Connect (ODBC), Simple Object Access Protocol (SOAP), Lightweight Directory Access Protocol (LDAP), Active Directory, Novell Directory Service (NDS), eXtensible Markup Language (XML), etc., to perform various development tasks including the dynamic translation of the logical data model into the physical data model 115. Interactions by the software developer with the system may be performed through one or more graphical user interfaces using, for example, Windows 2000, Internet Explorer, etc.

There may be verifications performed to confirm that the user is authorized to access the system. This may include, for example, requiring the user to provide user identification and a password.

III. The Logical Data Model

Figure 1B:
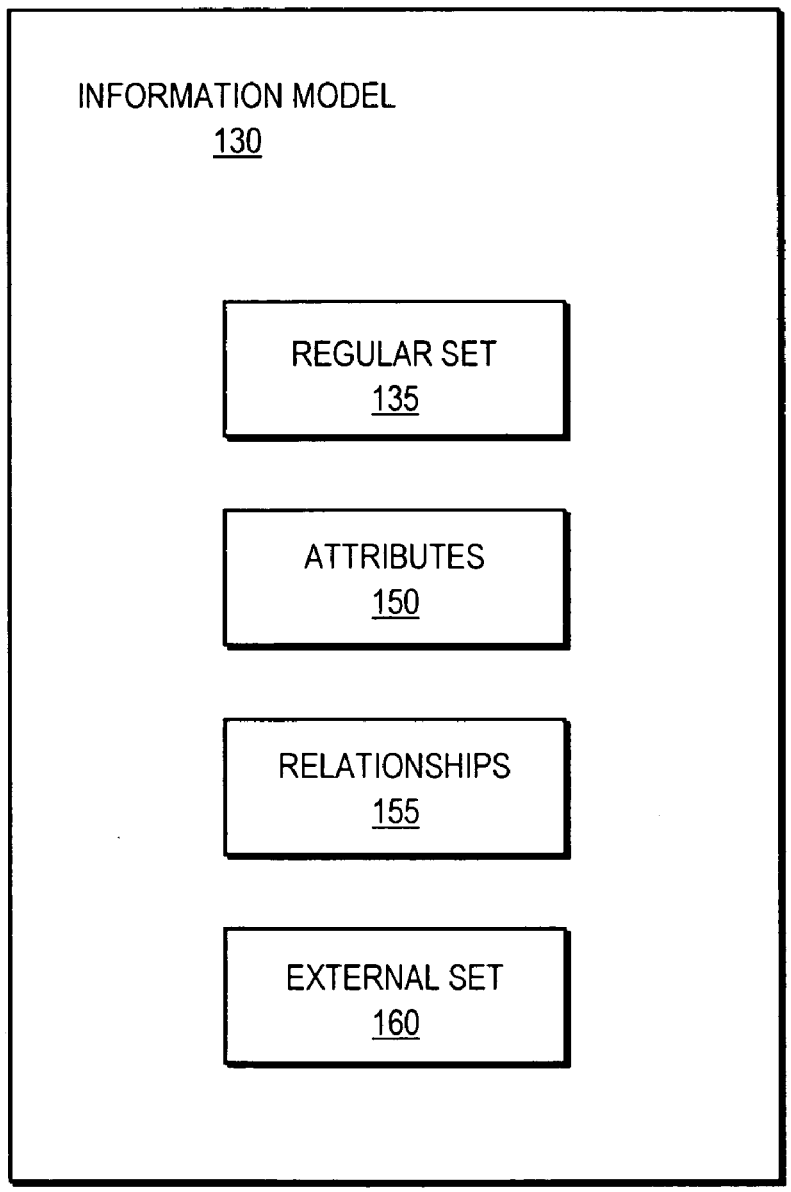
FIG. 1B is a block diagram illustrating some of the components in the logical data model.

FIG. 1B is a block diagram illustrating some of the components in the logical data model. The logical data model is also referred to as an information model. The software developer is also referred to as a user. Using the data-modeling framework 110, a user defines the information model 130 by describing logical groups of information and relationships of the groups to one another. A logical group of information is referred to as a set (or regular set) 135. Each set is represented in the physical database (or data store) associated with the physical model 115 and may include other enhanced features provided by the data-modeling framework 110. The physical representation (e.g., table in a relational database) is transparent to the user because the user only needs to be aware of the information available in the information model 130. Changes to the tables are made using the data-modeling framework 110. The information model 130 may include one or more external sets 160. The external sets 160 allow the user to incorporate external data sources into the information model 130.

Each set is comprised of one or more attributes. For example, the set 135 includes the attributes 150. The attributes 150 include data types that determine formats and characters that can be stored in the physical database associated with the physical data model 115. The system supports the standard data types supported by the physical database, enhanced data types that are not natively supported by the physical database but are made available by the system, and custom data types defined by the user.

A set may be related to other sets forming relationships. For example, relationships 155 may be defined for the set 135 to include one or more other sets that the set 135 is related to. A descriptive label or name is used to represent a set, an attribute, or a relationship. The descriptive label allows a user to provide a friendly, easy-to-recognize, and meaningful label that can be changed without affecting the physical data model. The data-modeling framework 110 manages the sets, the attributes, and the relationships in the information model, and the application framework 112 provides for access controls, workflow, security, history, content management, navigation, etc.

IV. Defining an Information Model

Figure 1C:
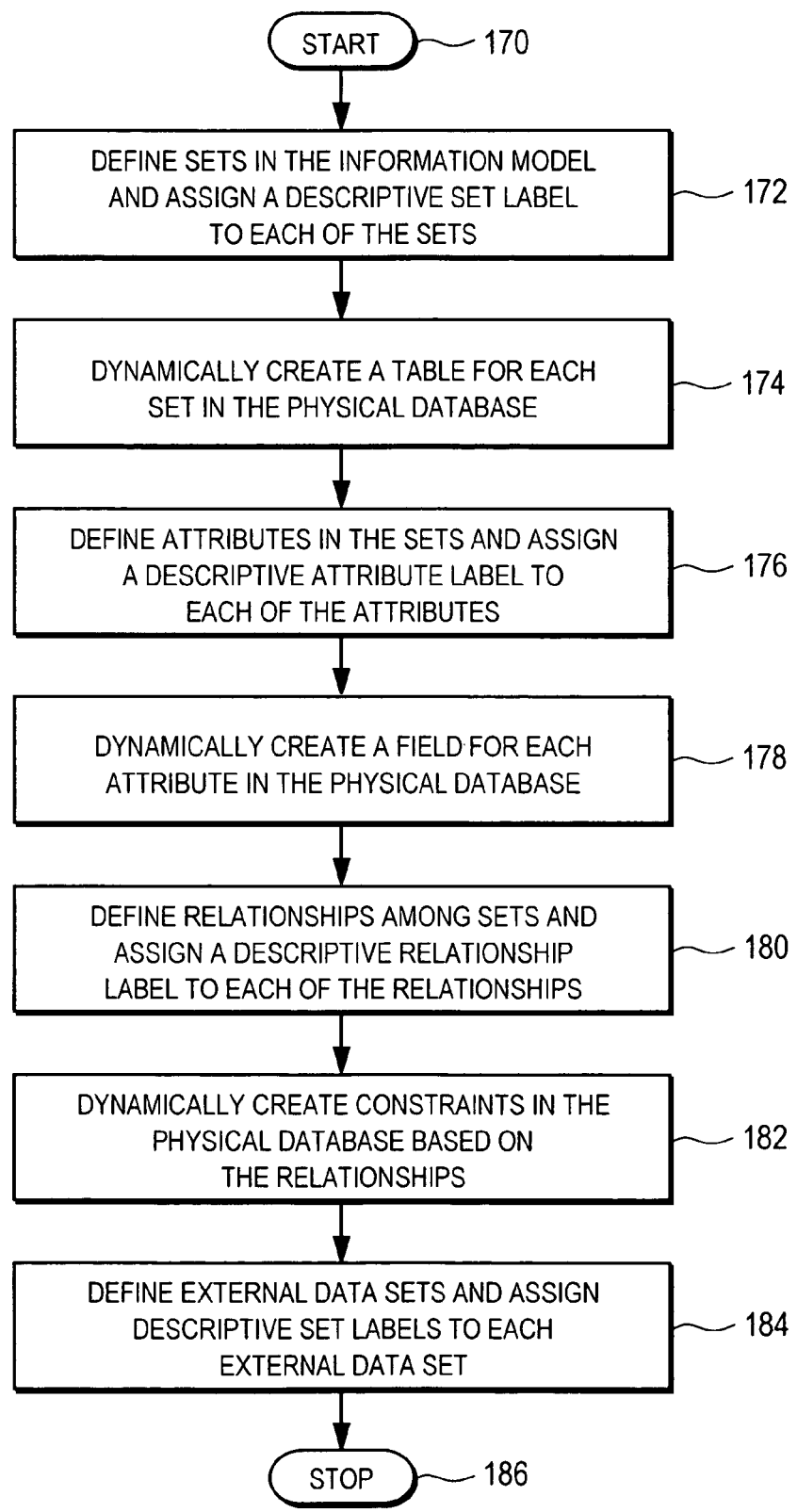
FIG. 1C is a flow diagram illustrating an information model definition process using the data-modeling framework in accordance with one embodiment of the invention.

FIG. 1C is a flow diagram illustrating an information model definition process using the data-modeling framework in accordance with one embodiment of the invention. The process is initiated by a user and starts at block 170. At block 172, the user defines the sets that make up the information model. There may be multiple sets in the information model. A set is representative of a table in the underlying physical data model, but is enhanced with meta data that is stored in the system tables. Each set is assigned a descriptive set label. As the sets are defined, corresponding meta data is stored in the system tables, and the corresponding tables are automatically generated by the data-modeling framework in the physical data model, as shown in block 174.

At block 176, when the sets have been created, the user populates the sets with attributes. The attributes are logical extensions of the fields of the tables in the physical data model. A set may contain one or more attributes, which are units of information regarding the actual data. Each attribute is assigned a data type, a descriptive attribute label, and a size when appropriate. By assigning a data type and size to the attribute, necessary constraints can be built in the physical data model by the data-modeling framework to validate the data associated with that attribute. As the attributes are defined, corresponding meta data is stored in the system tables and the resulting fields in the tables are automatically generated by the data-modeling framework in the physical data model, as shown in block 178.

At block 180, when one or more sets have been created, the user can define relationships between the sets, or between a set and itself. A relationship is made between a set and a related set. A relationship is bi-directional (i.e., from the set to the related set, and from the related set to the set). Each relationship is assigned two descriptive relationship labels, one for each direction of the relationship. A relationship is an extension of a join between two tables in the physical data model, including the physical join and meta data such as the directional, in-context labels. For example, a relationship between a set "Articles" and a related set "Person" might be labeled "Author" from the direction of set "Articles." That same relationship has a different meaning in the other direction. For example, the relationship can be labeled "Articles Authored" from the direction of set "Person." As the relationships are defined, resulting constraints in the tables are automatically generated in the physical data model and corresponding meta data is stored in the system tables by the data-modeling framework, as shown in block 182.

At block 184, the external data sets are defined. The external sets behave like sets, except that their definition and data is imported from external data sources. Each external set is assigned a descriptive set label. By defining and making the external sets available, the user can incorporate the external data sources into the information model. The process in FIG. 1C stops at block 186. At this point, the information model has been defined and translated by the data-modeling framework into the physical data model, including generation of a physical database and storage of corresponding meta data in the system tables. The physical database includes tables and fields corresponding to the sets and attributes defined in the information model. The physical database also includes constraints imposed on the tables and the fields based on the relationships among the sets, the data types of the attributes, etc.

Thus, the information model is tightly coupled with the data-modeling framework and the resulting physical database. Once the information model is defined, the user can create custom applications such as, for example, content management applications, to manage data in the database using the information model and the functionalities of the data-modeling framework.

Following is a list of examples of standard data types that may be used to define attributes:
Alphanumeric
Unicode Alphanumeric
Bit
Date/Time
Integer
Floating point
Long Text Following is a list of examples of enhanced data types that may be defined with the attributes:

File (Image): This data type stores and manages image files. It supports one or more different image file extensions including but not limited to, for example, .pdf, .vsd, .ppt, .jpg and .mpp. While some databases can store images in the database, it is often preferable to store the file on the server file system and refer to the file from the database. When the file type image is selected, the system automatically manages this file management activity for the user.

File (Non-image): This data type stores and manages non-image, e.g., document files. It supports one or more different file extensions including but not limited to, for example, .doc, xls, .ppt, .vsd, zip, and .pdf. While some databases can store documents in the database, it is often preferable to store the file on the server file system and refer to the file from the database. When the file type document is selected, the system automatically manages this file management activity for the user.

The user may create custom data types to be assigned to the attributes. The ability to define custom data types allows for the creation of type codes and allows the user flexibility of data choices for the attributes. There may be multiple custom data types, and each custom data type is assigned a data type name, and a description. Once a custom data type is defined, the user is able to specify members of the custom data type. A description may be specified for each member. Members are alphanumeric values that are unique to other members within each grouping. These alphanumeric values represent acceptable data values for the custom data type. For example, a custom data type "States" may have the members "Illinois", "California", and "New York". When adding an attribute to a set, the user may choose any of the available attribute types, including the custom data types, from a list of attribute types. When editing records in a set that includes attributes of the custom data type, only members of the custom data type will be valid entries for that attribute. In one embodiment, this set stores an ID/reference to the type codes so that if the name of the member is modified, the reference remains intact.

V. Adding Sets to the Information Model

FIG. 2A illustrates an example of a graphical interface listing sets defined in the information model. The interface 205 lists sets defined in the information model along with options that can be selected to manipulate the sets. The sets defined in the information model are displayed under the "Set Name" column 210. The sets may be displayed in alphabetical order. A new set may be added to the information model by selecting the "Add a New Set" option 215. When the interface 205 is implemented using HTML, the "Add a New Set" option 215 may be a link to another HTML page. Each of the sets under the "Set Name" column 210 may be edited or deleted by selecting the corresponding "Edit" option or "Delete" option under the "Edit" column 220 or the "Delete" column 225, respectively. In addition, contents of the set may be viewed by selecting the corresponding "Data" option under the "Data" column 230. The contents of a set include the data values stored in the attributes of the set.

Figure 2B:
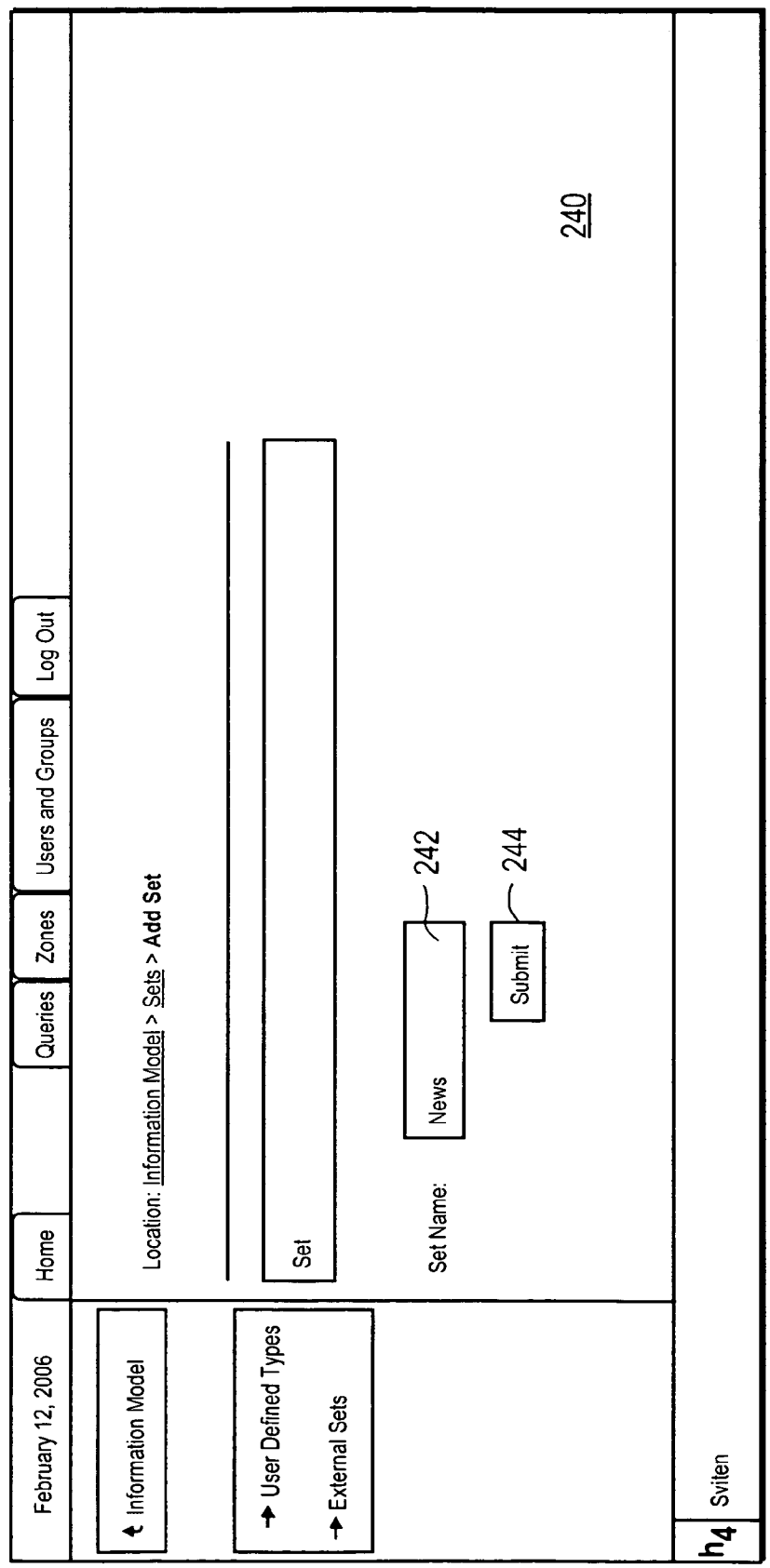
FIG. 2B illustrates an example of a graphical interface used to add a new set in the information model.

FIG. 2B illustrates an example of a graphical interface used to add a new set in the information model. The interface 240 in FIG. 2B is presented to the user to define or add a new set after the user selects the "Add a New Set" option described above with reference to FIG. 2A. The user assigns a descriptive set label to the new set using the "Set Name" input area 242. Unlike constraints typically placed on table names, the user is allowed to select any descriptive set label to represent the table. In this example, the descriptive set label for the new set is "News". Once the descriptive set label is selected, the user can cause to have a table automatically generated in the physical database by selecting the "Submit" option 244.

In one embodiment, system attributes are automatically generated by the data-modeling framework for each record or row in the tables. The system attributes include a record attribute and a content or asset attribute. The system attributes cannot be edited or deleted by the user. The record attribute is used to uniquely identify each record in the table. Every record in the table is assigned a unique record identifier. The unique record identifier may be used as a primary key of tables in the database. When a managed relationship (described later) is created between two sets, the record identifier in each set is used as the primary key to generate necessary database constraints in the physical database.

A group of records in a table may correspond to the same data in varying versions (e.g., stages of approval). These records are assigned a unique asset identifier. The unique asset identifier identifies each piece of content or asset in the physical database. The unique asset identifier enables management of multiple records having differing versions of the same content. For example, two different records, one representing an approved record and the other representing an unapproved record, may have the same asset identifier because they represent two different versions of the same record. However, each of these records has a unique record identifier. Following is a table (Table 1) that illustrates examples of how the record identifier and the asset identifier are assigned.

TABLE 1

Use of Asset Identifiers (AssetIDs) and Record Identifiers (RecordIDs)

| RecordID | AssetID | First Name | Last Name | Status |
|---|---|---|---|---|
| 1 | 333001 | Ben | Wolf | Approved |
| 2 | 333001 | Ben | Wolf | Unapproved |
| 3 | 333002 | John | Doe | Approved |
| 4 | 333002 | John | Doe | Unapproved |

Each of the four records in this table is assigned a unique record identifier ("RecordID") from "1" to "4", as shown in the first column. However, because the record with the record identifier of "1" and the record with the record identifier of "2" are two different versions of the same record, they both have the same asset identifier ("AssetID") "333001". The record having the record identifier "1" represents the "Approved" version, and the record having the record identifier "2" represents the "Unapproved" version.

FIG. 2C illustrates an example of a set summary graphical interface. The interface 246 in FIG. 2C is presented to the user after a new set is defined. The interface 246 provides summary information about the new set. This includes the descriptive set label "News" 248, the associated unique record identifier system attribute 250 ("H4ID"), and the associated unique asset identifier system attribute 252 ("H4AssetID"). Using the interface 246, the user can define new attributes for the set "News" 248 by selecting the option "Add New Attribute" 254. Furthermore, the user can define a new relationship between the set "News" 248 with other sets using the option "Add New Relationship" 256.

FIG. 2D illustrates an example of a graphical interface used to add new attributes to a set. The interface 260 in FIG. 2D displays the descriptive set label 262 ("News") for the set in which the new attribute is to be added. The interface 260 also includes an attribute name input box 264 for the user to assign a descriptive attribute label to the new attribute. The user also specifies the data type of the new attribute using the data type input box 266. The size input box 268 may be used to specify size of the new attribute when applicable. The size refers to a maximum allowable number of characters that can be stored in the physical database for the attribute. Once all of the necessary information is provided on the interface 260, the user can cause a field in the table corresponding to the set "News" to be automatically generated in the physical database by selecting the "Submit" option 270. Once the attributes, their data types and size have been defined, data values can be entered and stored in the physical database.

An existing attribute may be edited if the change has no effect on the data (content) stored in the database, and if the attribute is not being used in an attribute bundle. Once the attribute has associated data stored in the database or the attribute is in an attribute bundle, the type of edits that can be done to the attribute are limited and constraints may be imposed by how the data is defined and/or how the attribute is used in the attribute bundle. If attempts to change the attribute violate the constraints, then appropriate warnings or error messages may be generated.

FIG. 2E illustrates an example of a graphical interface presented to the user after the attribute is defined using the interface shown in FIG. 2D. The interface 272 in FIG. 2E displays the descriptive set label 262 ("News") and the descriptive attribute label 274 ("Title of Article") that is defined in the set "News". Other information displayed in the interface 272 includes the data type 276 of the attribute and its size 278. The attribute "Title of Article" 274 can be deleted using the delete option 280, or it can be edited using the edit option 284. Note that the asset identifier system attribute 281 and the record identifier system attribute 282 are automatically inserted into the set 262 ("News") and are shown as "cannot be deleted". The appropriate fields and constraints corresponding to the newly defined attribute "Title of the Article" are dynamically created in the physical database.

Figure 2F:
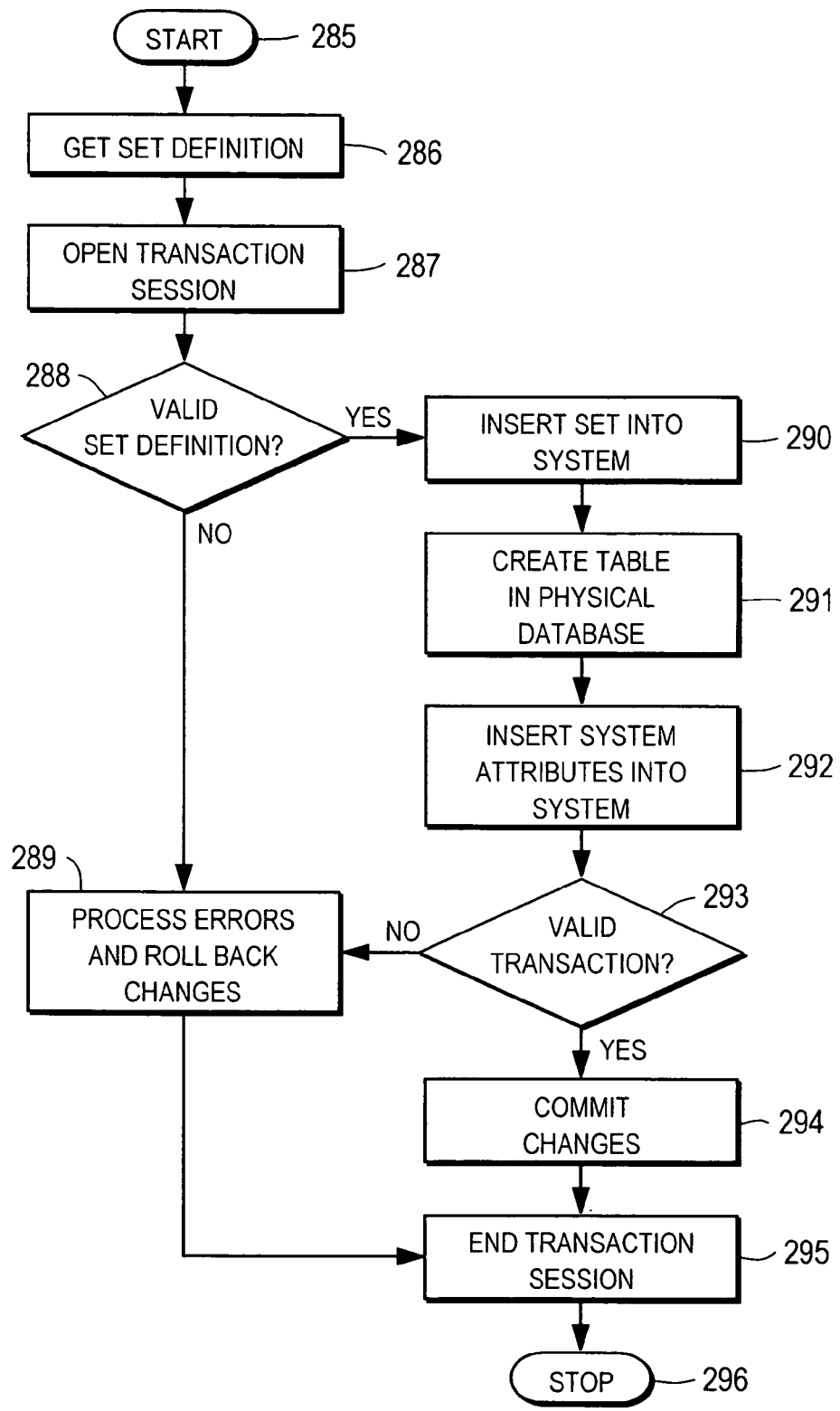
FIG. 2F is a flow diagram illustrating one example of a set definition process in accordance with one embodiment of the invention.

FIG. 2F is a flow diagram illustrating one example of a set definition process in accordance with one embodiment of the invention. The process starts at block 285. At block 286, the set definition is received. The set definition is received as a result of the user selecting an option to add a new set using the graphical interface of the information model. For example, the user may select the "Add a New Set" option described above with reference to FIG. 2A to add the new set. The user may then use the interface shown in FIG. 2B to specify a descriptive set label for the new set. At block 287, a transaction session is opened to manage errors and to batch changes to the physical database resulting from execution of various tasks in the process.

At block 288, a determination is performed to verify whether or not the set definition is valid. If the set definition is invalid, the process flows to block 289 (to process errors and to rollback changes). If it is valid, the process flows to block 290 where a new set record is inserted into the system. This set record is used to manage the set. At block 291, a new table is created in the physical database. The new table includes two system attributes that are created automatically. These system attributes form the initial two columns of the table. In addition, a content status column is also created in the new table. As attributes and data are defined and added, new columns are created and stored.

At block 292, the system attribute records are inserted into the system. These system attribute records include a record with the record identifier and a record with the asset identifier. These system attribute records are used to manage the set definition. At block 293, a determination is performed to verify if the transaction is valid. The transaction is valid if none of the previous operations result in an error condition. If the transaction is valid, the process flows to block 294 where the changes are committed, and the transaction session ends at block 295. From block 293, if the transaction is invalid, the process flows to block 289 where the changes are rolled back and appropriate error handling procedures are processed. This may include, for example, displaying a dialog box to a server administration interface indicating the error condition. The process stops at block 296.

VI. Updating Sets

Figure 3A:
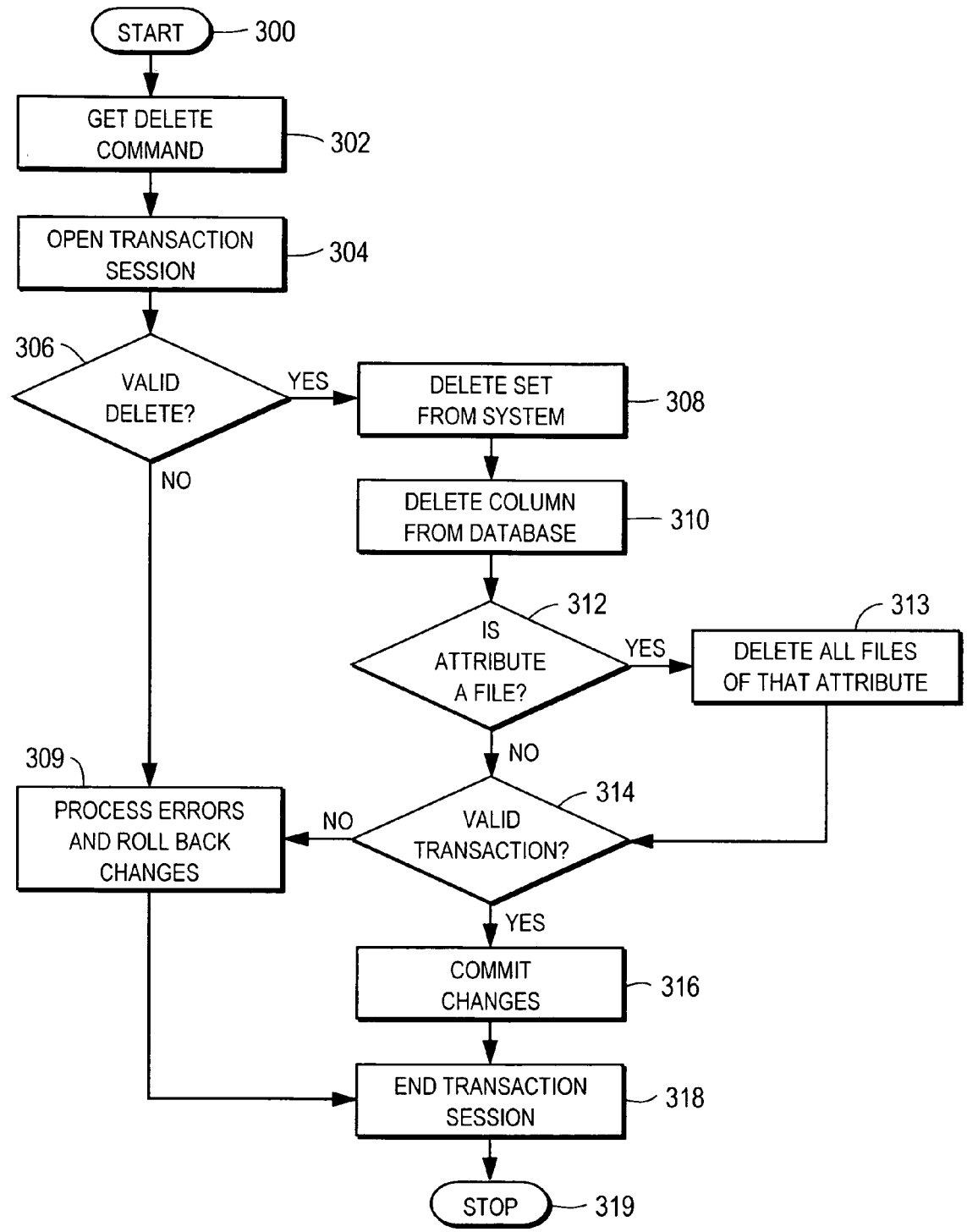
FIG. 3A is a flow diagram illustrating a process performed to delete an attribute from a set in accordance with one embodiment of the invention.

FIG. 3A is a flow diagram illustrating a process performed to delete an attribute from a set in accordance with one embodiment of the invention. The process starts at block 300. At block 302, a delete command is received as a result of the user selecting a "Delete" option to delete the attribute. For example, the user may use the interface illustrated in FIG. 2A to list all of the existing sets and to select a set for display of its attributes. The user may then use the interface illustrated in FIG. 2E to select an attribute to delete from the selected set. At block 304, a transaction session is opened. The transaction session is used to manage errors and to batch changes to the physical database resulting from execution of various tasks in the process. This provides the ability to automatically rollback changes to the database. For example, when an error occurs during the deletion process, tasks already completed can be reversed or rolled back to a state before the attribute delete command was executed.

At block 306, a determination is performed to validate the delete command. The validation checks for presence of data, relationships, attribute bundles (a reusable attribute group) and other dependencies. In order to delete an existing attribute, several conditions need to be met. For example, the attribute cannot be used in an attribute bundle, and the attribute cannot be used in a relationship. If one or more of these conditions is not met, the delete command is invalid, and the process flows to block 309 (described later). In some cases using the GUI provides a warning that prompts the user to continue when certain conditions exist. For example, the attribute cannot have data (content) stored in the database. These validations help protect applications built using the dynamic data model of the present invention from harmful changes. If the delete command is validated, the process flows to block 308 where the set records are deleted from the system. At block 310, the column associated with the attribute is deleted from the physical database.

At block 312, a determination is performed to verify whether or not the attribute is associated with the file data type (e.g., images, documents). In one embodiment, all files of this attribute are not stored in the database and need to be deleted separately. If the attribute is associated with the file data type, the process flows to block 313 where all of the files of the attribute are deleted. This includes draft versions and temporary files.

At block 314, a determination is performed to verify whether or not the transaction is valid. The transaction is valid if none of the previous operations result in an error condition. If the transaction is valid, the process flows to block 316 where the changes are committed, and the transaction session ends at block 318. When the conditions to delete an attribute are met and prior to deleting the attribute, a confirmation message may be displayed.

From block 314, if the transaction is invalid and results in one or more errors, the process flows to block 309 where the changes are rolled back and appropriate error handling procedures are processed. This may include, for example, displaying a dialog box to the server administration interface indicating the error condition. The process of FIG. 3A stops at block 319.

An existing set may be edited by selecting the "Edit" option described above for FIG. 2A. The "Edit" option allows the user to edit the set, including modifying the descriptive set label, modifying the attributes in the set, and modifying the relationships associated with the set. An existing set may also be deleted using a "Delete" option that was described for FIG. 2A. In order for the set to be deleted, several conditions have to be met. These include deleting all the attributes defined in the set together with any associated data stored in the physical database and deleting all relationships established with the set. If these conditions are not satisfied, any attempt to delete a set causes warnings or error messages to be generated.

Figure 3B:
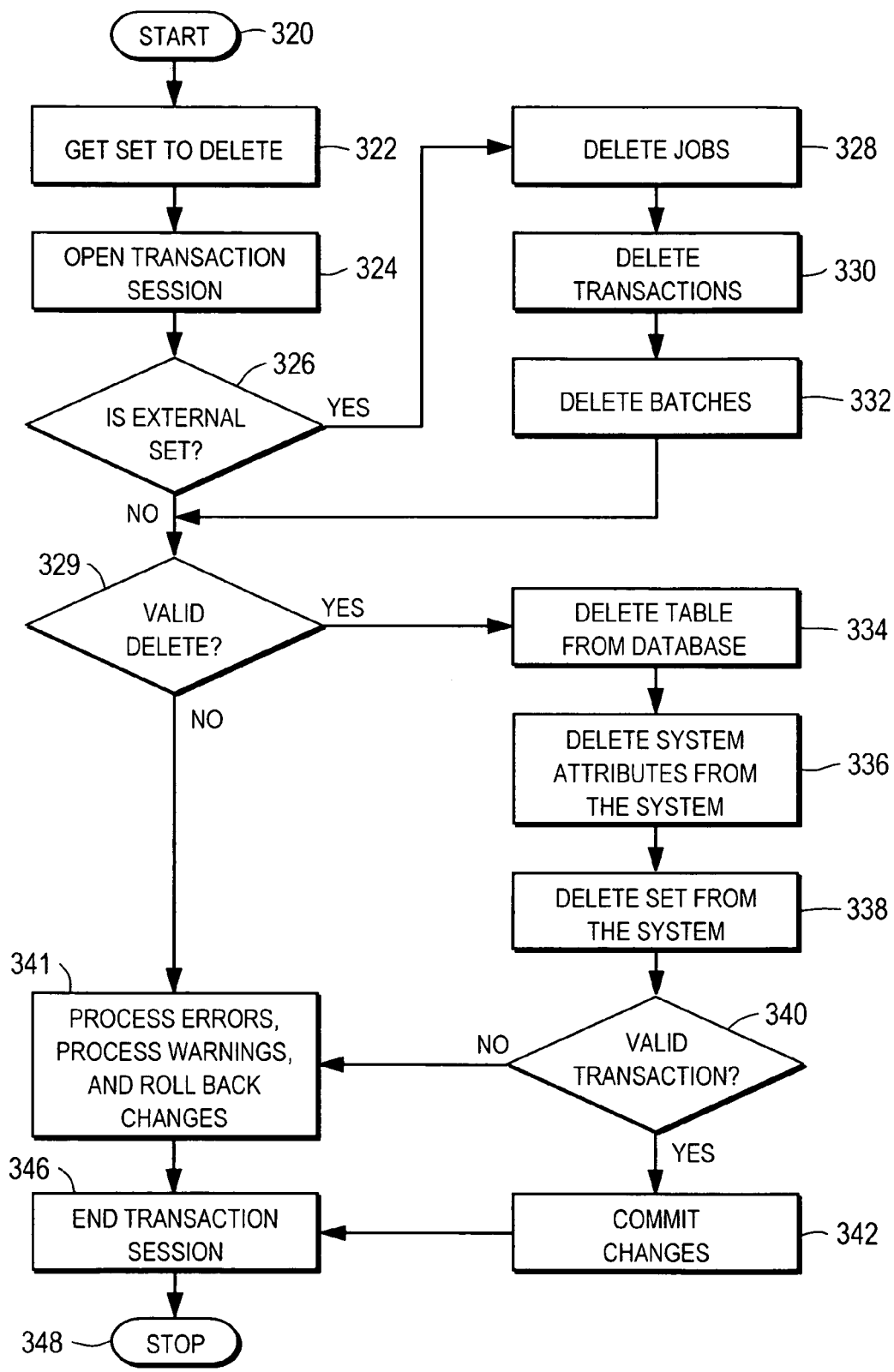
FIG. 3B is a flow diagram illustrating one example of a set deletion process in accordance with one embodiment of the invention.

FIG. 3B is a flow diagram illustrating one example of a set deletion process in accordance with one embodiment of the invention. The process starts at block 320. At block 322, the set deletion request is received. The set deletion request is received as a result of the user selecting a set to delete from a list set graphical user interface such as the example illustrated in FIG. 2A. At block 324, a transaction session is opened to manage errors and to batch changes to the physical database resulting from execution of various tasks in the process. This provides the ability to automatically rollback changes to the database. For example, when an error occurs during the set deletion process, tasks already completed can be reversed or rolled back to a state before the set deletion command was executed.

At block 326, a determination is performed to verify whether or not the set to be deleted is an external set. If so, the process flows to block 328 where special operations are performed to delete the external sets, including executing delete jobs (328), delete transactions (330), and delete batches (332). Processing of the external sets is described in more detail below. However, it is to be noted that deleting the external sets are handled differently from deleting the regular or non-external sets.

From the block 326, if the set to be deleted is not an external set, the process flows to block 329 where a determination is performed to verify whether or not the delete set command is valid. The delete set command is not valid if, for example, there exists a relationship between this set and another set, there are attributes in the set, etc. If the delete set command is not valid, the process flows to block 341 where errors are processed and changes are rollbacked.

From block 329, if the delete set command is valid, the process flows to block 334 where the table corresponding to the set is deleted from the physical database. At block 336, the system attributes associated with the set are deleted. At block 338, the set is deleted from the system.

At block 340, a determination is performed to verify whether or not the delete set transaction is valid. For example, the transaction is not valid if errors occur during operations performed in blocks 334 to 338. If the transaction is not valid, the process flows to block 341 for error processing. If the transaction is valid, the process flows to block 342 where the deletion or change is committed and the table is permanently removed from the physical database. At block 346, the transaction session ends. The process stops at block 348.

FIG. 4 illustrates an example of a graphical interface used to display content of a set. The interface 400 in FIG. 4 displays the records in the selected set in a table format with each column heading representing an attribute defined in the set. For example, the column 402 ("H4ID") represents the unique record identifier system attribute. The records may be displayed in a sorted order based on the unique record identifier number 402 ("H4ID") assigned to each record. A total records field 404 may be displayed to indicate a total number of records in the set.

VII. Working with External Data Sources

FIG. 5A illustrates an example of a graphical interface used by the user to define a new external data source. The user may define many external data sources. In this example, to add a new data source, the user specifies a descriptive name for the external data source using the data source name input box 502. The user also specifies data connection credentials (e.g., an ODBC connection string) in the connection string input box 504. This allows the information model to connect to any compatible data source.

FIG. 5B illustrates an example of a graphical interface used by the user to define external sets in the external data source. Once the external data source is defined, external sets can be defined. The system may include many external sets. The user specifies a descriptive set label for the external set using the input box 506. The user may also need to specify the data source associated with the external set being defined using the input box 508.

FIG. 5C illustrates an example of a graphical interface presented to the user listings tables and views available from the external data source. The user may select certain tables or views that the user wants to be integrated with the information model by, for example, checking the appropriate select boxes (e.g., box 511 for Attorney Info.) corresponding to the selected tables listed under the source table category 510.

FIG. 5D illustrates an example of a graphical interface presented to the user listings fields in a table selected from the external data source. The fields in the tables selected by the user are listed along with the database field name 512, field label 514, data type 516, and the size of the field 518. The user needs to select a primary key or keys to be used as the unique record identifier (e.g., by selecting the appropriate "Primary Key" boxes). The user also needs to select which fields from the external database should be added to the external set (e.g., by selecting the appropriate "Add" boxes). Note that while the record identifier for a regular set is automatically generated and used to uniquely identify the record, the primary keys from the external data set are used to validate the uniqueness of each record.

Figure 5E:
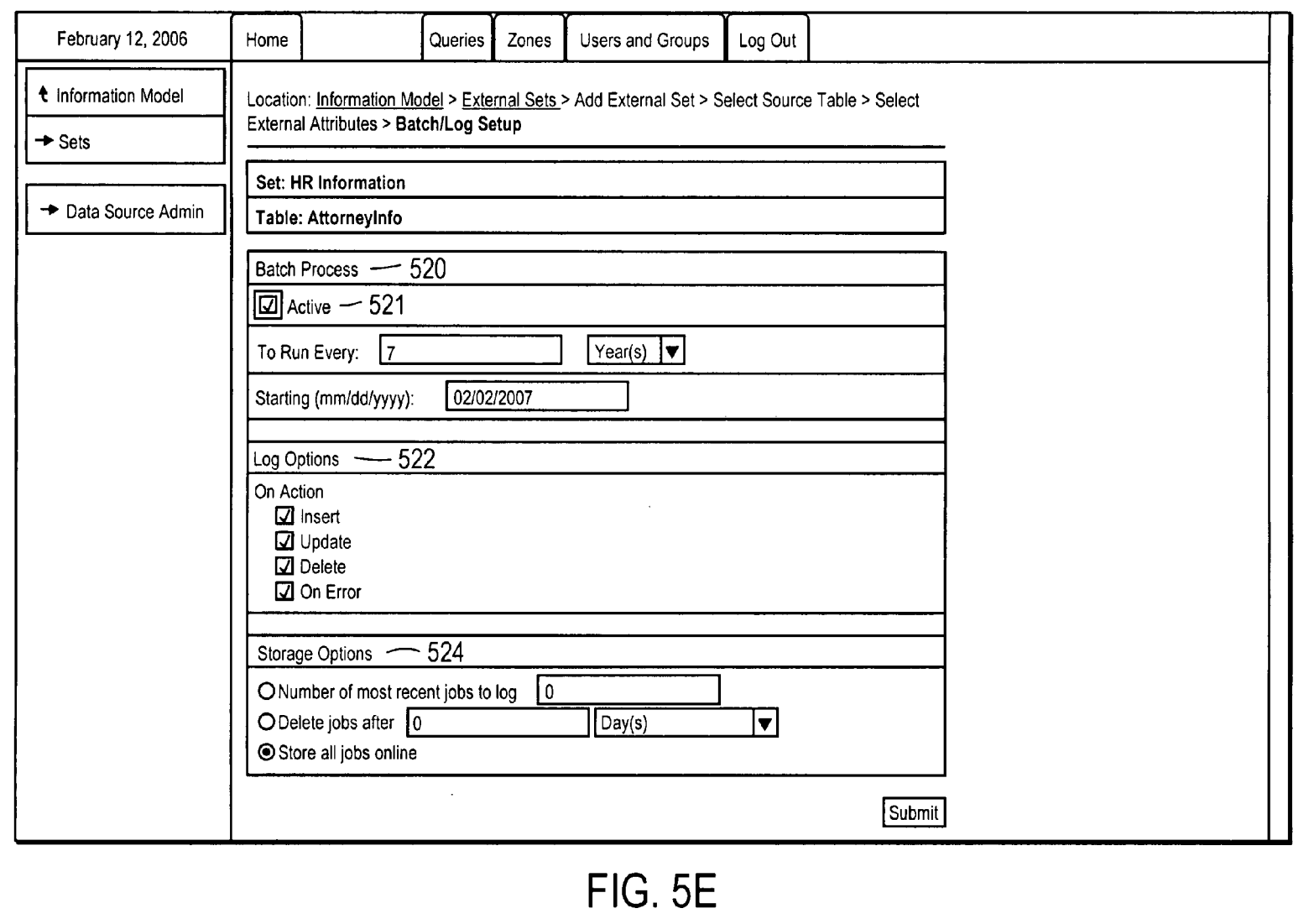

FIG. 5E illustrates an example of a graphical interface used by the user to configure an external data source. Once the external set and its attributes are defined, they are ready to be populated with data from the external data source. This may be carried out on an ad hoc, batch or live basis. For example, using the batch process window 520, the user may specify that the batch process is effective immediately by selecting the "Active" option 521. The user may also specify a run or execution frequency, a starting date, etc. When a batch process is run, each record is reviewed for conflict resolution.

The Log Options 522 allows the user to determine the actions that are to be recorded into a log file. The log file is maintained to track the transmission, error resolution, security, etc. The Storage Options 524 allows the user to determine the number of files to be stored at any given time. When the option to store a number of the most recently selected logs is chosen, the logs may be deleted on a first-in first-out basis. When the option to delete records after a defined period of time is selected, the option may go into effect starting at, for example, the next hour or other designated update time.

Figure 5F:
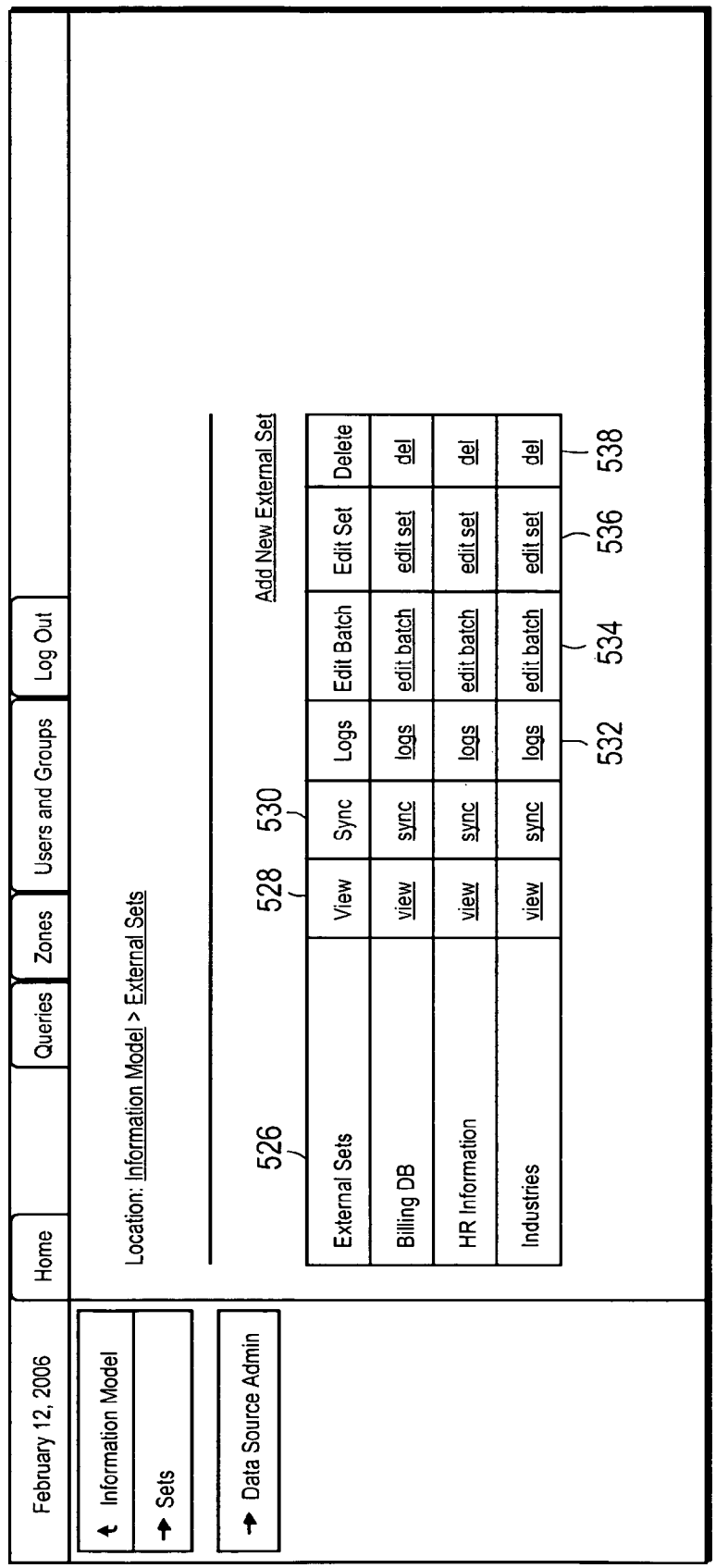
FIG. 5F illustrates an example of a graphical interface presented to the user listing the defined external data sets.

FIG. 5F illustrates an example of a graphical interface presented to the user listing the defined external data sets. After the external set is created, the appropriate tables, fields and constraints are automatically generated in the physical database to represent the external set. In addition the necessary configuration settings have been stored to manage the batch processes. The user is presented with the defined external sets 526 and may choose to view an external set by selecting the "View" option 528. This includes being able to view the physical data brought in from the external source in a table format. The user may start the batch process and generate a new transaction log by selecting the "Sync" option 530. Synchronizing allows pulling updated data from the external data source. Other options may be made available to the user including the ability to view the log file (by selecting the "Logs" option 532), edit the batch process (by selecting the "Edit batch" option 534), edit the external set (by selecting the "Edit set" option 536), and delete the external set (by selecting the "Del" option 538).

Figure 5G:
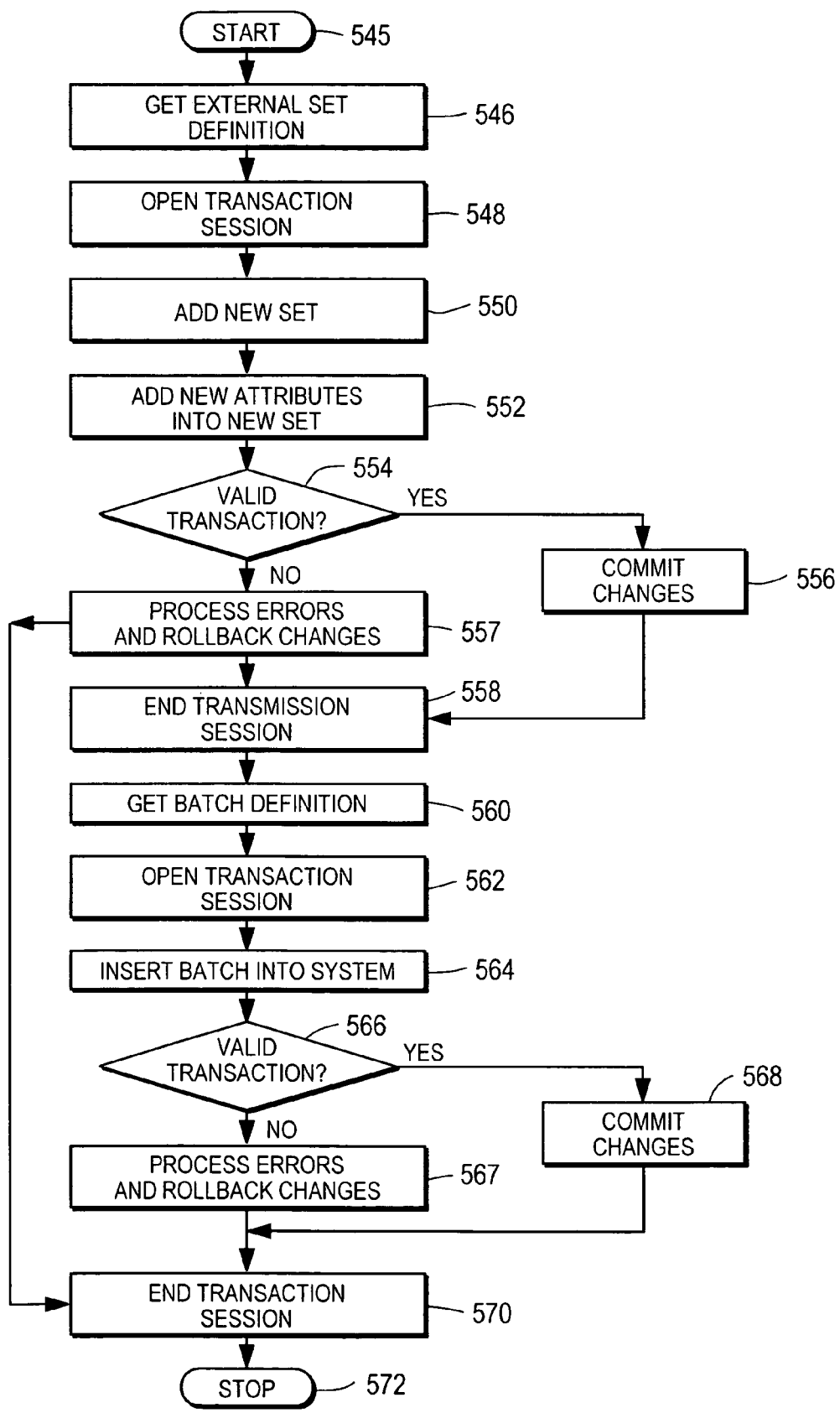
FIG. 5G is a flow diagram example illustrating an external set definition process in accordance with one embodiment of the invention.

FIG. 5G is a flow diagram example illustrating an external set definition process in accordance with one embodiment of the invention. The process starts at block 545. At block 546, an external set definition (e.g., selected fields from an external table, a selected primary key, etc.) is received as a result of the user selecting an "Add External Set" option using, for example, the graphical interface illustrated in FIG.

5B. At block 548, a transaction session is opened. At block 550, a new external set is added into the system. At block 552, attributes are added into the external set. At block 554, a determination is performed to verify whether or not the external set definition transaction is valid. If the transaction is invalid, the process flows to block 557 to process errors and to rollback changes. The process then flows to block 570 where the transaction session ends. From block 554, if the transaction is valid, the process flows to block 556 where changes are committed. The process then flows to block 558 where the transmission session ends.

The import of data from the external sources is performed by executing one or more batch processes according to a configurable schedule. The batch process may require a communication to be set up with the external data source using, for example, an ODBC (Open DataBase Connectivity) connection string. The batch definition (e.g., frequency, logs, etc.) is specified by the user using, for example, the interface shown in FIG. 5E. Thus, it may be possible that there is a lapse of time between completion of the transmission session to define an external data set (block 558) and a beginning of an operation to get the batch definition (block 560). At block 562, a transaction session is opened for the batch process. At block 564, the batch process is inserted into the system. At block 566, a determination is performed to verify whether or not the batch transaction is valid. If it is not valid, the process flows to block 567 to process errors and to rollback changes. If the transaction is valid, the process flows to block 568, where the changes are committed. Blocks 567 and 568 flow to block 570 where the transaction session ends. The process stops at block 572.

VIII. Relationship Management

A relationship is defined with a management type, including "managed" and "non-managed". A managed relationship is automatically managed by the system. A managed relationship is structured between two specific sets (e.g., Employee and Office) in a direct path. When a managed relationship is created, there is an association table that is created to store the specific relationship between the two assets (or records). The primary keys for the two related assets in the set are stored in the association table. A recurring process is set up on the database to maintain each managed relationship at a defined interval. The process evaluates whether a database index would increase performance for a relationship. If performance would be increased and an index does not already exist, an index is created and the system data is updated to reflect the change. If performance would not be increased and an index currently exists, the index is removed and the system data is updated to reflect the change.

A non-managed relationship is not managed by the system. The non-managed relationship is most useful when used in context with external sets. It differs from a managed relationship in that the physical structure for the relationship (i.e., the association table) is not created as a single table, but rather as a mapping between one or more tables until the related set is reached. Also the path of the relationship is abstracted (it could be between one (1) and an infinite number of sets) into a database view object.

A non-managed relationship is created to emulate the physical structure of a managed relationship. This emulation allows relationships that are not managed by the system (either they are imported from other systems or managed by the user) to behave as a managed relationship when used in data management. When a non-managed relationship is created, a database view is created that emulates the structure of a relationship association table. If there existed a non-managed relationship, the view would be constructed to join the two tables on the attributes specified by the non-managed relationship process and return the primary keys of the Employee set and the Office set, just as if the relationship was managed. The user may use a non-managed relationship between sets to create a string of relationships from one set to another set and so on, until a target set is reached; thus allowing a relationship to be established between a source set and a target set even though the two sets may not have any physical data relationship.

Each relationship is assigned a relationship type that includes the standard database physical join types (e.g., one-to-one, one-to-many, many-to-one, many-to-many) and also includes enhanced join types not natively supported by the database, but provided for by the system (e.g., inherits or inherits many).

An "inherits" relationship type means that a related set's attributes extend the set, thereby behaving in the application framework 112 as if the two sets are one. For example, an "Employee" set may inherit a "Person" set, where the "Person" set contains data common to employees and non-employees. In this way, the "Employee" set appears to contain all of the attributes of the "Person" set as well as its own attributes. This object oriented design principle is common to object oriented programming languages, but is not a concept supported in physical data modeling. Depending on the management type and the relationship type, the necessary tables, fields and database constraints are automatically generated in the physical database by the data-modeling framework to support the relationships.

Figure 6A:
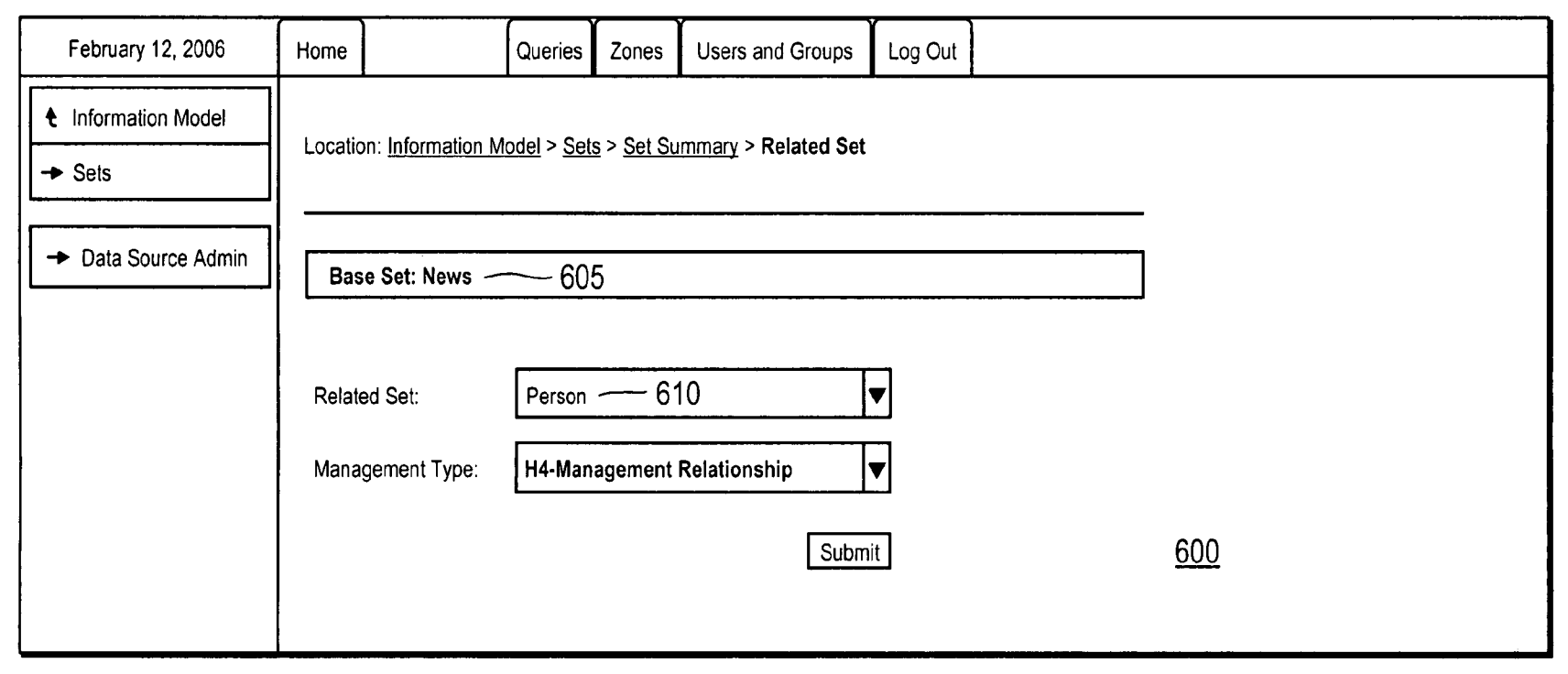

FIG. 6A illustrates an example of a graphical interface used to define a managed relationship. The user may define a managed relationship by first selecting an option to add a new relationship as described above. The add relationship interface 600 shown in FIG. 6A allows the user to specify a related set to establish a relationship with a base set. In this example, the base set is "News" 605, and the set "Person" is specified as the related set using the related set input box 610. The user also specifies the management type using the management input box 615. In this example, the management type is "managed relationship".

Figure 6B:
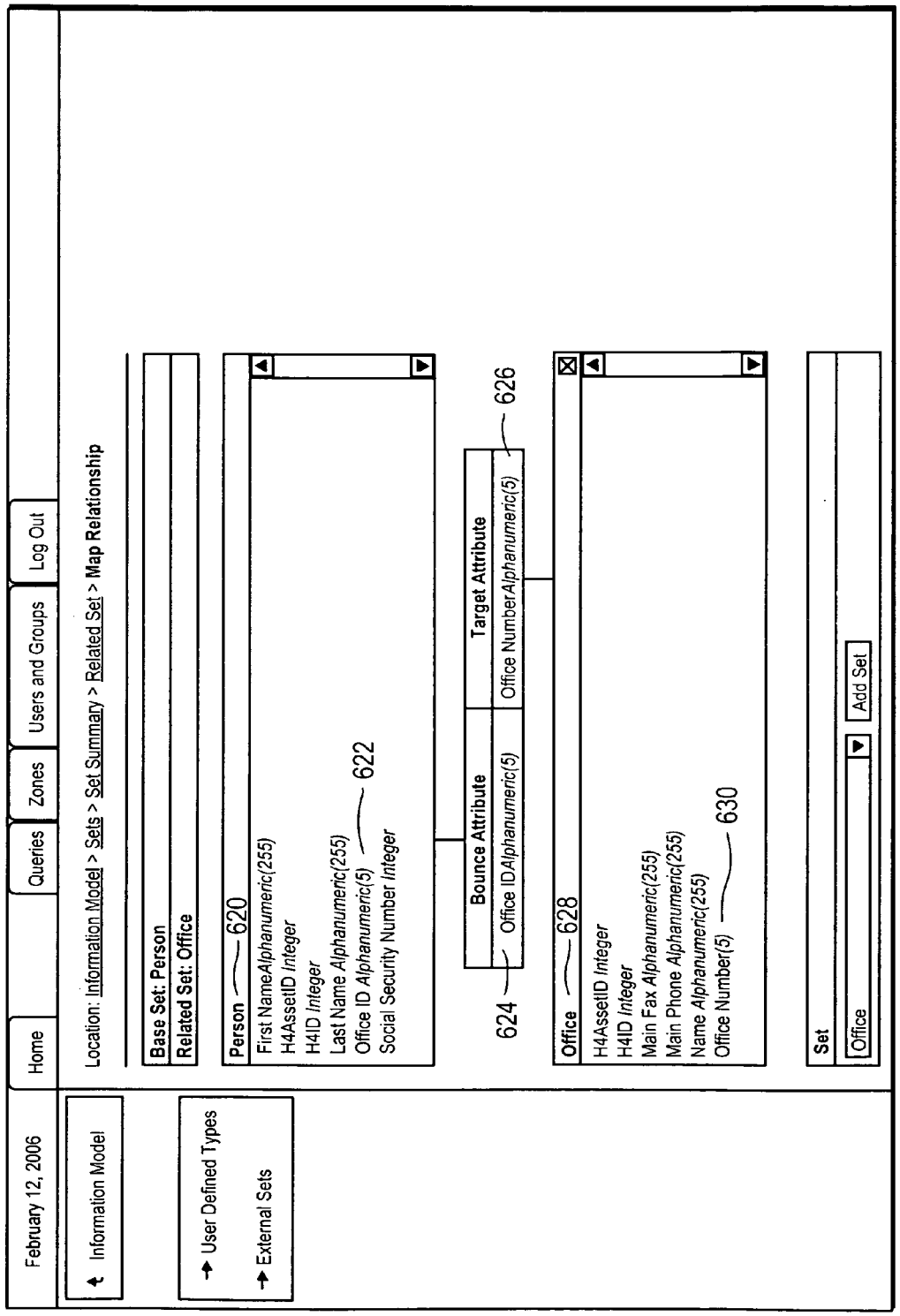
FIG. 6B illustrates an example of a graphical interface used by the user to map relationship between two sets to form a non-managed relationship.

FIG. 6B illustrates an example of a graphical interface used by the user to map relationships between two sets to form a non-managed relationship. In a non-managed relationship, the user needs to specify an attribute in the base set and an attribute in the related set that form the relationship between the sets. In this example, the base set "Person" 620 includes an attribute "Office ID" 622. The related set "Office" 628 includes an attribute "Office Number" 630. The user may map the relationship between the two sets by, for example, dragging the "Office ID" attribute 622 and the "Office Number" attribute 630 and dropping them in the source attribute box 624 and the target attribute box 626, respectively.

FIG. 6C illustrates an example of a graphical interface displaying information about a set including its attributes and related sets. The user can create one or more relationships from a set to one or more related sets. In this example, the set "Person" 640 is related to four other sets, as listed under "Related Set" 644. Each of these four relationships is assigned a descriptive relationship label, as listed under "Relationship" 642. New relationships can be added using the "Add New Relationship" option 646. An existing relationship can be edited using the "Edit" option 648, or it can be deleted using the "Delete" option 650.

When defining a new relationship, in addition to specifying the management type, the user also needs to specify a relationship type (e.g., many-to-many, one-to-many, etc.). Selection of the relationship type may be constrained by rules that prevent some selections because of characteristics of the related set(s). For example, a base set cannot inherit an external set, nor can a base set form an "inherits multiple" relationship with another set that already has an inherits multiple relationship with a third set, etc. If the rules are violated, the user is presented with an error message or a warning. Once a relationship is established in the information model, appropriate constraints are automatically created in the physical database to enforce the relationship and to maintain database integrity. Using the GUI of the present invention to add a new relationship minimizes the chance of encountering an error because the GUI presents logically valid options to the user.

Figure 6D:
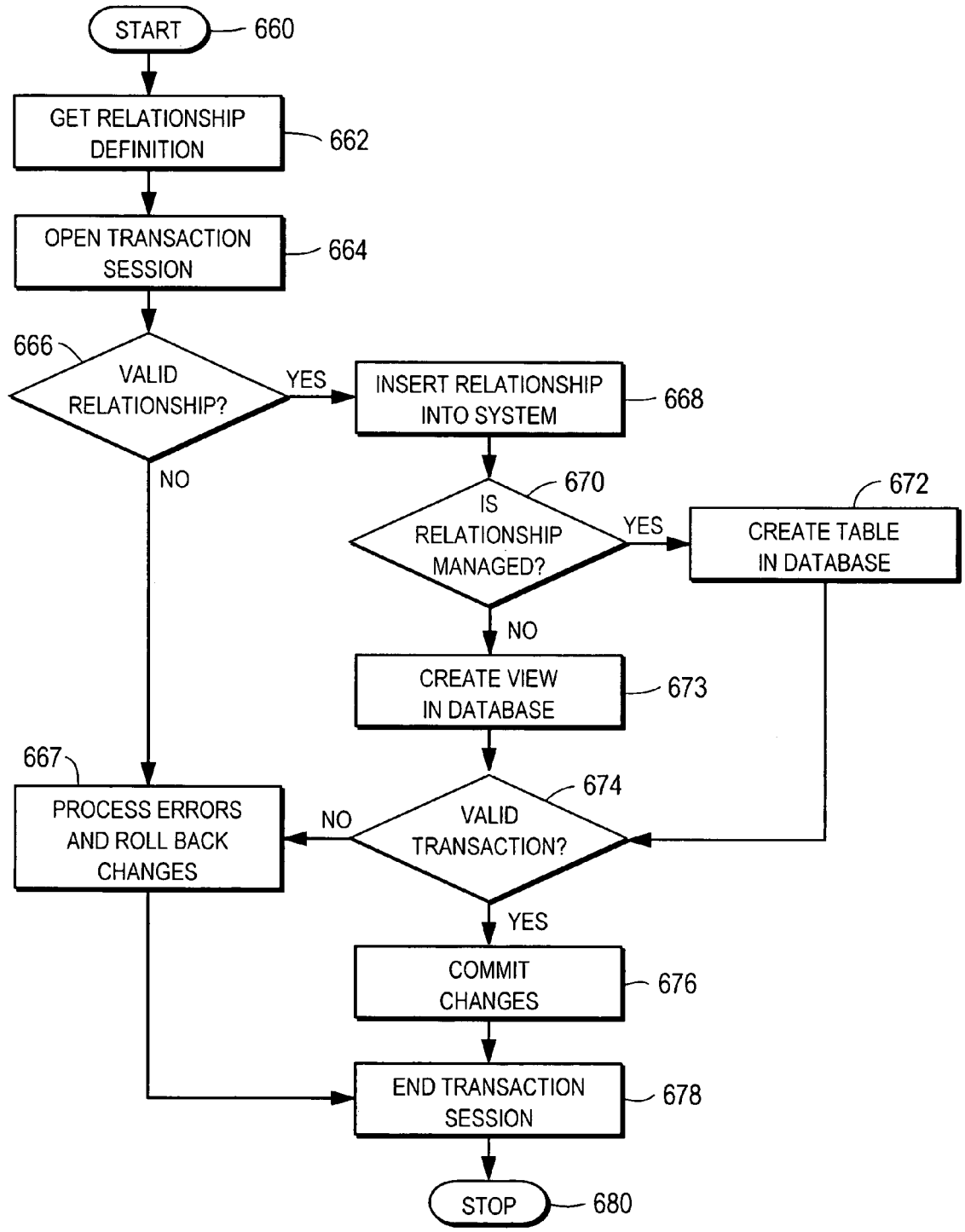
FIG. 6D is a flow diagram illustrating an example of a relationship definition process in accordance to one embodiment of the invention.

FIG. 6D is a flow diagram illustrating an example of a relationship definition process in accordance with one embodiment of the invention. The process starts at block 660. At block 662, a relationship definition is received. This may be as a result of the user selecting the "Add New Relationship" option 646 illustrated in FIG. 6C. As described above, the user may define a relationship by selecting a base set and a related set, a management type (e.g., managed or non-managed), and a relationship type (e.g., one-to-one, one-to-many, inherits, etc.). The user also needs to provide a descriptive relationship label for each direction of the relationship (assuming the relationship is bi-directional). In addition, when the relationship is non-managed, the user also needs to map the source set to the target set and to select the attributes to join the selected map set. All such selections by the user form the relationship definition received by the operation in block 662 of FIG. 6D.

At block 664, a transaction session is opened to manage errors and to batch changes to the physical database resulting from execution of various tasks in the process. This provides the ability to automatically rollback changes to the database.

At block 666, a determination is performed to verify whether or not the relationship definition is valid. If it is not valid, the process flows to block 667 to perform error handling and any necessary rollback. If it is valid, the process flows to block 668 where a relationship record is created and inserted into the information model. The data modeling framework manages both the logical relationships in the information model and the physical relationship in the physical database.

At block 670, a determination is performed to verify whether or not the relationship is defined as a managed relationship. If it is a managed relationship, the process flows to block 672, where a new table is created in the physical database. If it is a non-managed relationship, the process flows to block 673, where a view is created in the physical database. Both blocks 673 and 672 flow to block 674, where a check is made to determine if the relationship transaction is valid (e.g., no errors from previous operations). If the transaction is not valid, the process flows to block 667 to process the errors and rollback changes. If the transaction is valid, the process flows to block 676, where the changes are committed. At block 678, the transaction session ends. The process stops at block 680.

When deleting an existing managed relationship, certain conditions need to be met before the physical database is updated. For example, the relationship to be deleted cannot be used in an attribute bundle. In addition, when the relationship is used by an application in a query, then it cannot be deleted. There may be other conditions that need to be met before the relationship can be deleted. When the conditions are not met, an error message may be presented to the user. When editing an existing managed relationship, the proposed changes cannot violate any rules that may exist due to the data stored in the physical database or due to the relationship being used in an attribute bundle. Editing an existing relationship may include changing the descriptive relationship label and changing the relationship type. If the proposed change violates any of these conditions, an error message may be presented to the user.

Figure 6E:
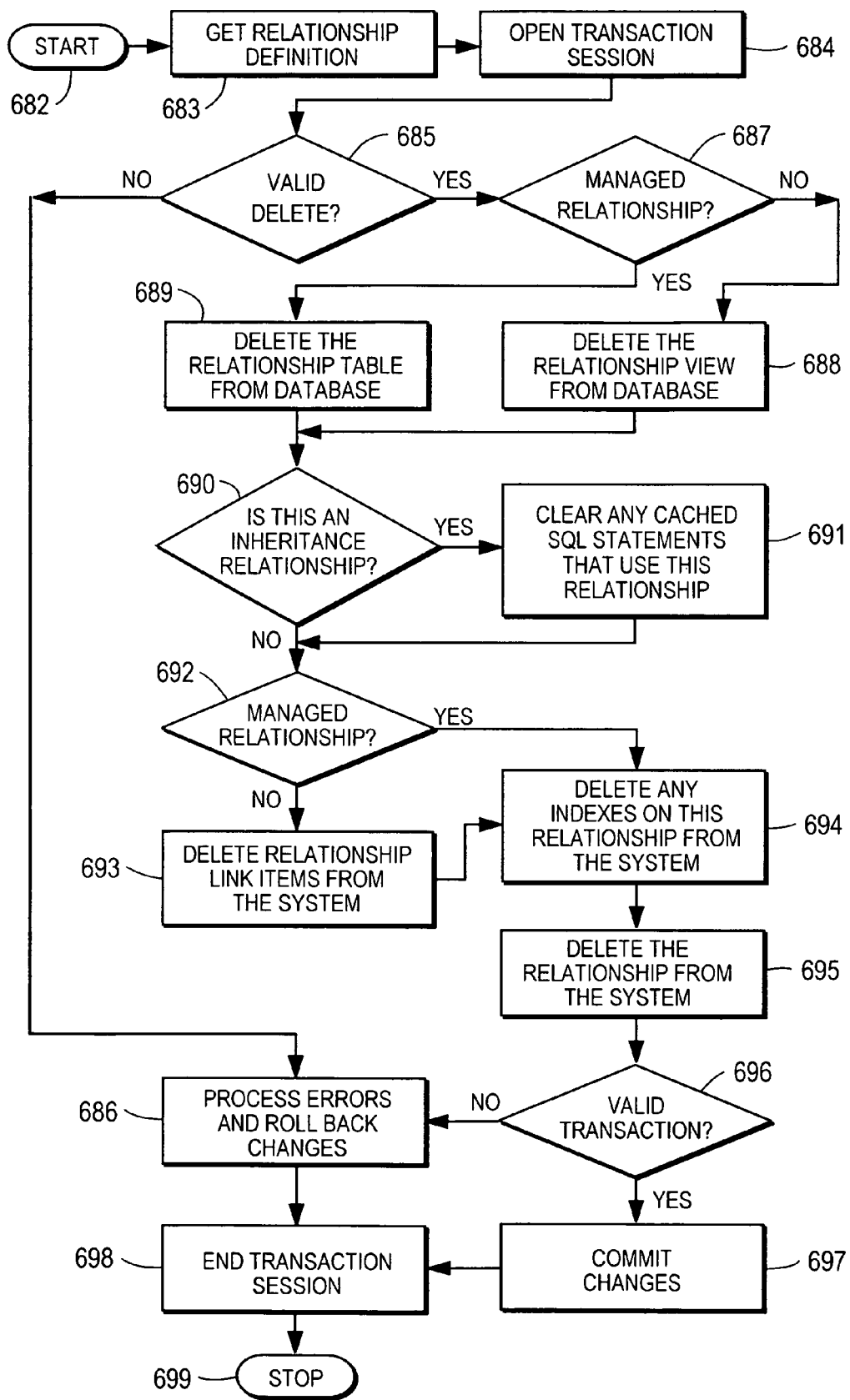
FIG. 6E is a flow diagram illustrating an example of a relationship deletion process in accordance to one embodiment of the invention.

FIG. 6E is a flow diagram illustrating an example of a relationship deletion process in accordance with one embodiment of the invention. The process starts at block 682. At block 683, a relationship deletion command is received. This may be as a result of the user selecting the "Delete" option as described above with reference to FIG. 6C. At block 684, a transaction session is opened to manage errors and to batch changes to the physical database resulting from execution of various tasks in the process. This provides the ability to automatically rollback changes to the database.

At block 685, a determination is performed to verify whether or not the relationship deletion command is valid. If it is not valid, the process flows to block 686 to perform error handling and any necessary rollback. If it is valid, the process flows to block 687 where a determination is performed to verify that the relation is a managed relationship. If it is a managed relationship, the process flows to block 689 where the corresponding relationship table is deleted from the physical database. If it is not a managed relationship (i.e., if it is a non-managed relationship), the process flows to block 688 where the corresponding relationship view is deleted from the physical database.

Both blocks 689 and 688 flow to block 690 where a determination is performed to verify whether or not the relationship is an inheritance relationship. If it is an inheritance relationship, the process flows to block 691 where any cached SQL statements that use this relationship are cleared and the process continues to block 692. Cached SQL statements require some explanation. As mentioned above, SQL or query statements are automatically generated by the system to assist the user in accessing the physical database. In one embodiment, some query statements are cached by the system. Query caching is managed on an events-based model. Certain events (e.g., a request for a query's statement) create and store the cached statement, and certain events (such as removing a query attribute from a query's order) clear the cached statement. The cached version of the statement exists after the first time the statement is run. The cached version of the statement is cleared for several reasons. For example, if attributes are added to the attribute bundle, if an attribute bundle is edited, if conditions are added to the query, or if attributes are inserted or deleted from a query's order, or if the query order is edited, the cached version of the statement is cleared. The concepts of attribute bundles, conditions and query orders are described further below.

From block 690, if the relationship is not an inheritance relationship, the process flows to block 692 where a determination is performed to verify whether or not the relationship is a managed relationship. When the relationship is a non-managed relationship, any relationship link items associated with this relationship are deleted, as shown at block 693. The process then flows to block 694.

From block 692, if the relationship is a managed relationship, the process flows to block 694 where any indexes on this relationship are deleted from the system tables. At block 695, the relationship is deleted from the system. At block 696, a determination is performed to verify that the relationship deletion transaction is valid (e.g., that there were no errors in the previous operations in the process). If so, the changes are committed, at block 697. If the transaction is not valid, the errors are processed and any changes are rolled back at block 686. The transaction session ends at block 698. The process stops at block 699.

IX. Adding Members to A Custom Data Type

FIG. 7A illustrates an example of a member definition interface used to add members to a custom data type. In this example, a member definition interface 700 is presented to the user. The custom data type 705 is labeled as "Employee Status". The member of the custom data type can be entered using the member name input box 710. The member represents the available data elements to be stored in the database for the attribute with the corresponding data type. The user may provide text describing the member name using the description input box 715. A decode value is entered using decode input box 720.

The same member definition interface 700 may then be used to add other members to the custom data type. When all of the members of the custom data type are defined, any necessary changes to the physical database are automatically performed to support the custom data type. FIG. 7B illustrates an example of an interface showing members in a custom data type. The members in the custom data type "Employee Status" 725 are shown in the member list 730.

X. Application Framework—Data Management and Application Features

Figure 8:
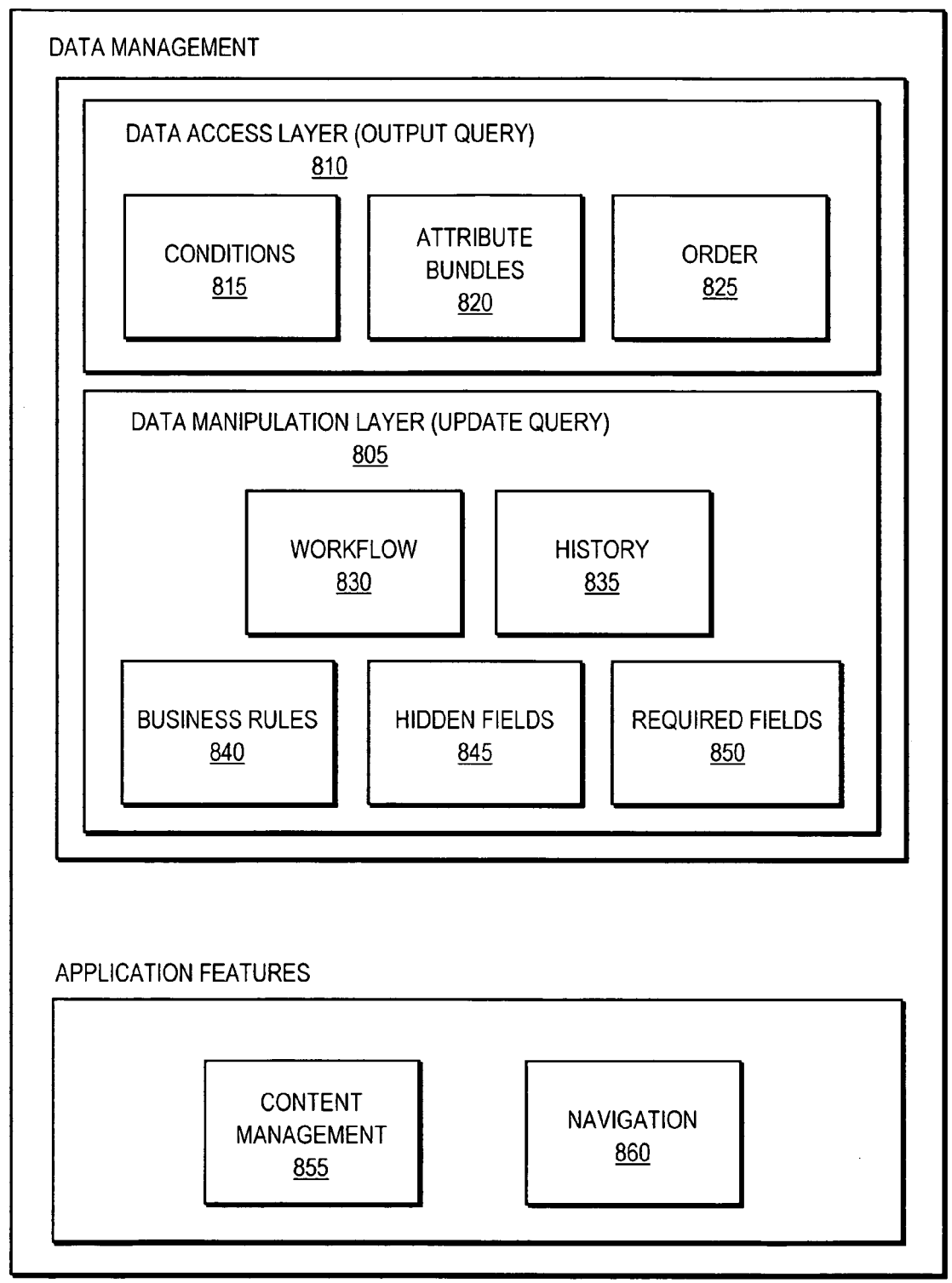
FIG. 8 is a block diagram illustrating examples of features available in the application framework.

FIG. 8 is a block diagram illustrating examples of features available in the application framework. As described above with reference to FIG. 1, the application framework 112, including data management aspect and application features aspect, may be integrated with the data-modeling framework 110 in an overall system. The data management aspect provides the developer user with tools to automatically generate SQL code to access data from the physical database or to update data in the physical database. The developer is presented with a series of efficient GUIs, which are used to create highly complex query statements. The resulting SQL code is dynamically generated based on the configuration and cached in the database.

As these queries are modified, the system automatically adjusts that code stored in the physical database, saving time and reducing the chance of error. This feature allows the developer to quickly implement enhancements to the application and reduce the time required for application testing. In addition, the system provides the developer the ability to write custom SQL statements and have them stored in the system as output queries.

The data management aspect of the application framework 112 includes a data manipulation layer 805, which is used to process update queries, and a data access layer 810, which is used to process output queries. A query is a logical representation of SQL code that allows information to be entered into and retrieved from the system. Output queries are used to retrieve information stored in the system. This information is returned in a data shape (record sets inside of record sets). Update queries are used to create an interface for entering information into the system. The data access layer 810 allows the user to form output queries using conditions 815, attribute bundles 820 and order 825 (each described in more detail in the following sections.) The data manipulation layer 805 allows the user to form update queries using workflows 830, history 835, business rules 840, hidden fields 845, and required fields 850 (each described in more detail in the following sections).

The application features aspect of the application framework 112 includes content management 855 and navigation 860. The content management 855 provides content screens or presentation templates that include all functionality required to display a summary list of the records being managed, to add new, edit, delete, un-approve, reset, save, and approve records, and to display the detailed content edit/entry screen with edit history and workflow.

The navigation 860 includes an interface to allow the developer to build an entire navigation structure (e.g., parent-child relationships between navigation items) for an application without coding. Each navigation item is dynamically generated and can be linked to an update query, an output query, or a page. The system automatically generates the necessary code to manage and display the navigation structure.

The objects generated using the components in the application framework 112 are available for the developer to access using the system API interfaces. For example, the developers can use the API interface to access the output queries, update queries, navigation structures, etc. for use in building applications. Although not described here, there may be other components in the application framework 112 and they may also be accessible through the system API interface.

XI. Attribute Bundles

The system further provides the user with the ability to select and create a reusable group of attributes (referred to as attribute bundles) for use in a query (in an SQL string) based on the relationship between sets. The relationship between sets provides the available attributes that can be selected for use in the query. There may be many attribute bundles defined in the information model, and each attribute bundle can be assigned a descriptive attribute bundle label.

To define an attribute bundle, the user selects a root set. Once the root set is selected, the attributes in the root set along with the attributes of any related sets are bundled together to form the attribute bundle. The ability to define the attribute bundles makes all of the attributes in the related sets available to applications that use the information model, thus streamlining the process of creating queries.

Figure 9A:
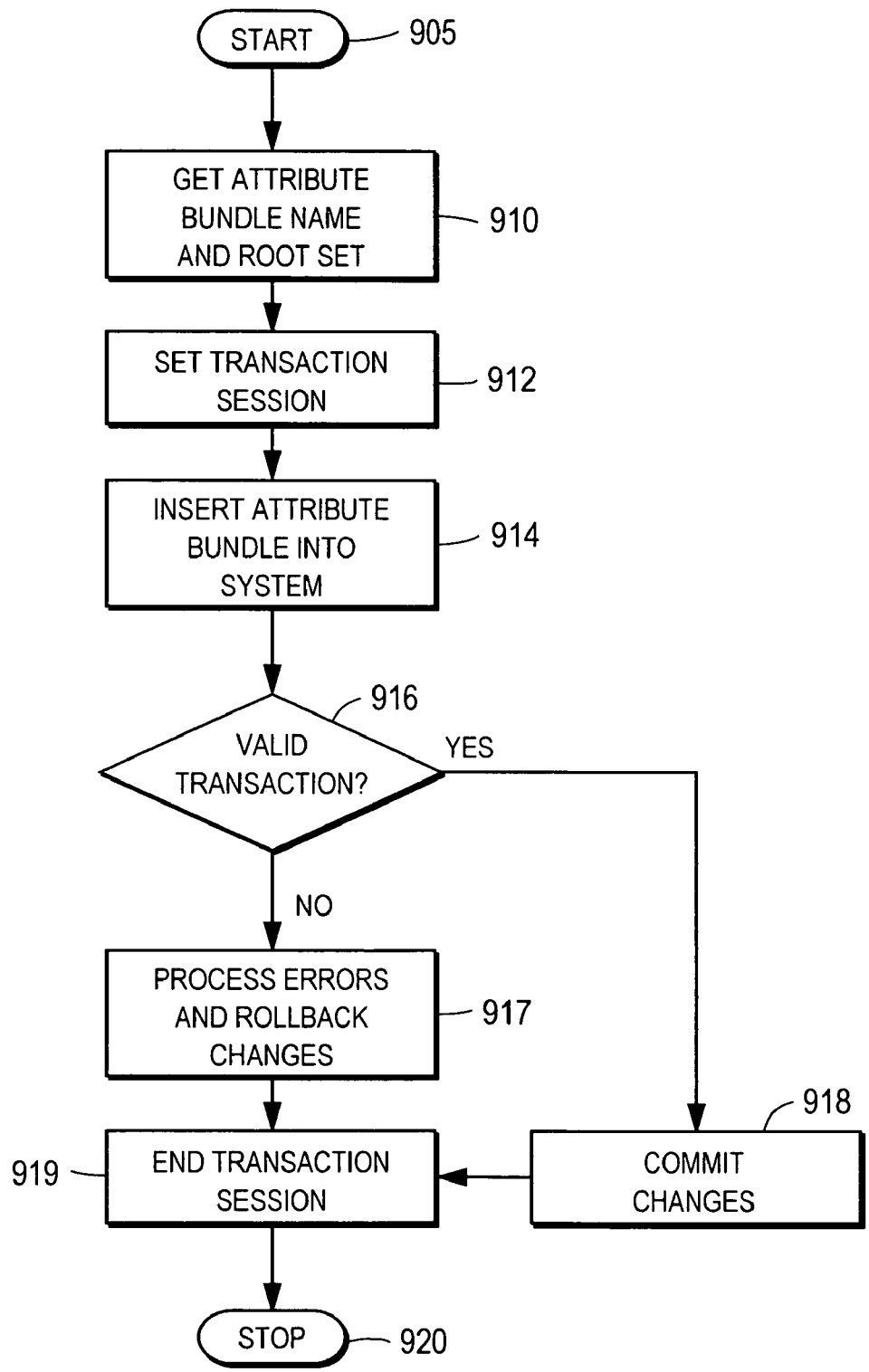
FIG. 9A is a flow diagram illustrating a process used to add an attribute bundle.

FIG. 9A is a flow diagram illustrating a process used to add an attribute bundle. The process starts at block 905. At block 910, the descriptive attribute bundle label and the identity of the root set are received. At block 912, a transaction session is opened to manage errors and to batch changes to the physical database. This provides the ability to automatically rollback changes to the database. At block 914, an attribute bundle record is created and inserted into the information model. The attribute bundle record may include the attributes from the root set and the attributes from the related set(s). At block 916, a determination is performed to verify whether or not the "add attribute bundle" transaction is valid (i.e., no errors so far). If the transaction is not valid (errors), the process flows to block 917 where the errors are processed and any changes already made are rollbacked. From the block 916, if the transaction is valid, the process flows to block 918 where the changes are committed. The process then flows to block 919 where the transaction session ends. The process stops at block 920.

Figure 9B:
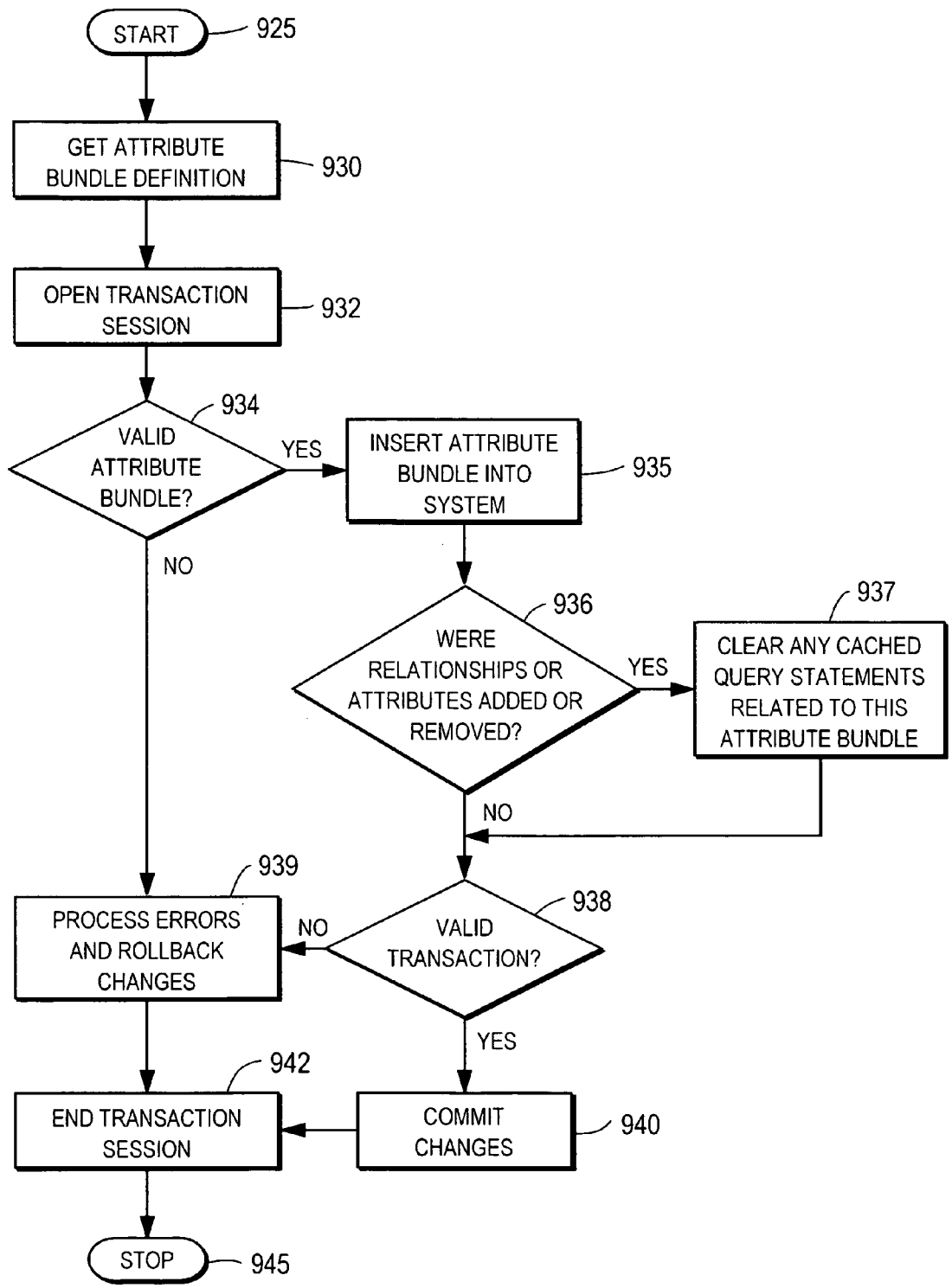
FIG. 9B is a flow diagram illustrating a process used to edit an attribute bundle.

FIG. 9B is a flow diagram illustrating a process used to edit an attribute bundle. The process starts at block 925. At block 930, the attribute bundle definition to be edited is received. This may be because the user changed the attributes in the sets related to the attribute bundle, or because the user selected additional attributes to be added to an existing attribute bundle. Any of these actions may increase or decrease the number of attributes in the attribute bundle.

At block 932, a transaction session is opened. At block 934, a check is performed to determine if the attribute bundle is valid. If it is a valid attribute bundle, the process flows to block 935 where an updated attribute bundle record is created and inserted into the information model. The updated attribute bundle record includes the attributes selected by the user from the root set and the related set(s).

The process then flows to block 936, where a determination is performed to verify whether or not the relationships or attributes were added or removed. If so, the process flows to block 937, where any cached query statements related to this attribute bundle are cleared. From there, the process flows to block 938.

Returning to block 936, if no attribute were added or removed, the process flows to block 938, where a check is made to determine if the "Edit Attribute Bundle" transaction is valid (i.e., no errors have occurred so far). If not, the errors are processed and the changes are rollbacked, as illustrated at block 939. If, however, the transaction is valid, the changes are committed, as illustrated at block 940. The transaction session ends at block 942, and the process stops at block 945. Note that the user may also modify the descriptive attribute bundle label. In this situation, the modified descriptive attribute bundle label is updated in the information model by opening a transaction session that includes all necessary error verifications before committing the change.

XII. Conditional Queries

Figure 10:
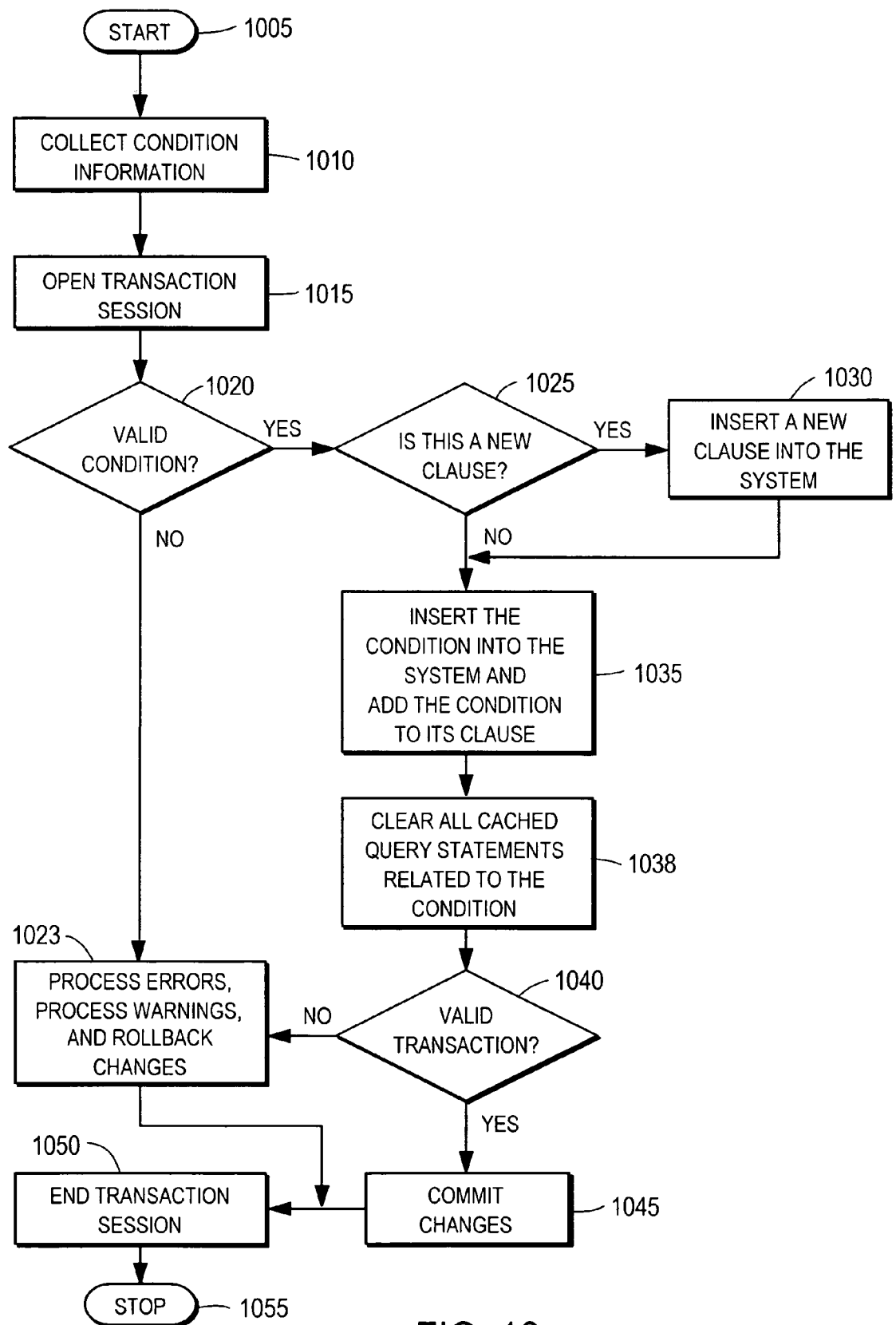
FIG. 10 is a flow diagram illustrating one example of the addition of a condition process in accordance with one embodiment of the invention.

The system provides the ability to add conditional statements (referred to as conditions) to a query (resulting SQL statement) by using attributes selected in an Attribute Bundle. FIG. 10 is a flow diagram illustrating one example of the addition of a condition process in accordance with one embodiment of the invention.

The process starts at block 1005. At block 1010, the add condition request is received. In one example, this request determines 1) the attribute that the condition is applied to, 2) the set the condition is applied to (either the root set or a related set), 3) the parent clause of the condition (if one exists), 4) the addition type of the condition, 5) the type of join of the condition, and 6) whether or not the condition is a parameter condition. Examples of an addition type of condition are "Append" or "Boolean". A new "Append" condition is added to the end of its parent clause. A new "Boolean" condition replaces the parent clause of the condition with a new clause that contains a "Boolean" join between the previously existing condition and the new condition. Joins of a condition can be, for example, through "Ands" or "Ors". The type of join determines the type of logic used when applying multiple conditions. If the condition is a parameter condition, the parameter name is stored to allow for run time application of the condition.

At block 1015, a transaction session is opened to manage errors and to batch changes. At block 1020, a determination is performed to verify that the condition addition command is correct. If the addition command is not correct, the process flows to block 1023 where errors are processed, warnings are processed, and changes are rollbacked. From block 1020, if the command is valid, the process flows to block 1025 where a determination is performed to verify whether or not the condition is to be added to a new clause.

If a new clause is to be added, the process flows to block 1030, where the new clause is added. The process then flows to block 1035. From block 1030, if the condition is to be added to an existing clause, the process flows to block 1035. At block 1035 the condition is added to the system and the condition is added to either a new clause or the previously determined clause. From block 1035, the process flows to block 1038, where any cached query statements relating to this condition are cleared.

From block 1038, the process flows to block 1040, where a determination is made to verify that the addition of the condition transaction is valid (e.g., no resulting errors from previous operations). If the transaction is not valid, the process flows to block 1023 to process errors, process warnings, and rollback changes. If the transaction is valid, the process flows to block 1045, where the changes are committed. At block 1050, the transaction session ends. The process stops at block 1055.

XIII. Working with Queries Part 1: Query Order

The system provides the ability to determine the order of the records and its attributes returned by a query. The system automatically generates the appropriate code in the SQL statement to represent the order. Query order can determine the attributes (and their order) to be included in a summary list of the records and the attributes (and their order) to be included in a detail list of the records.

Figure 11:
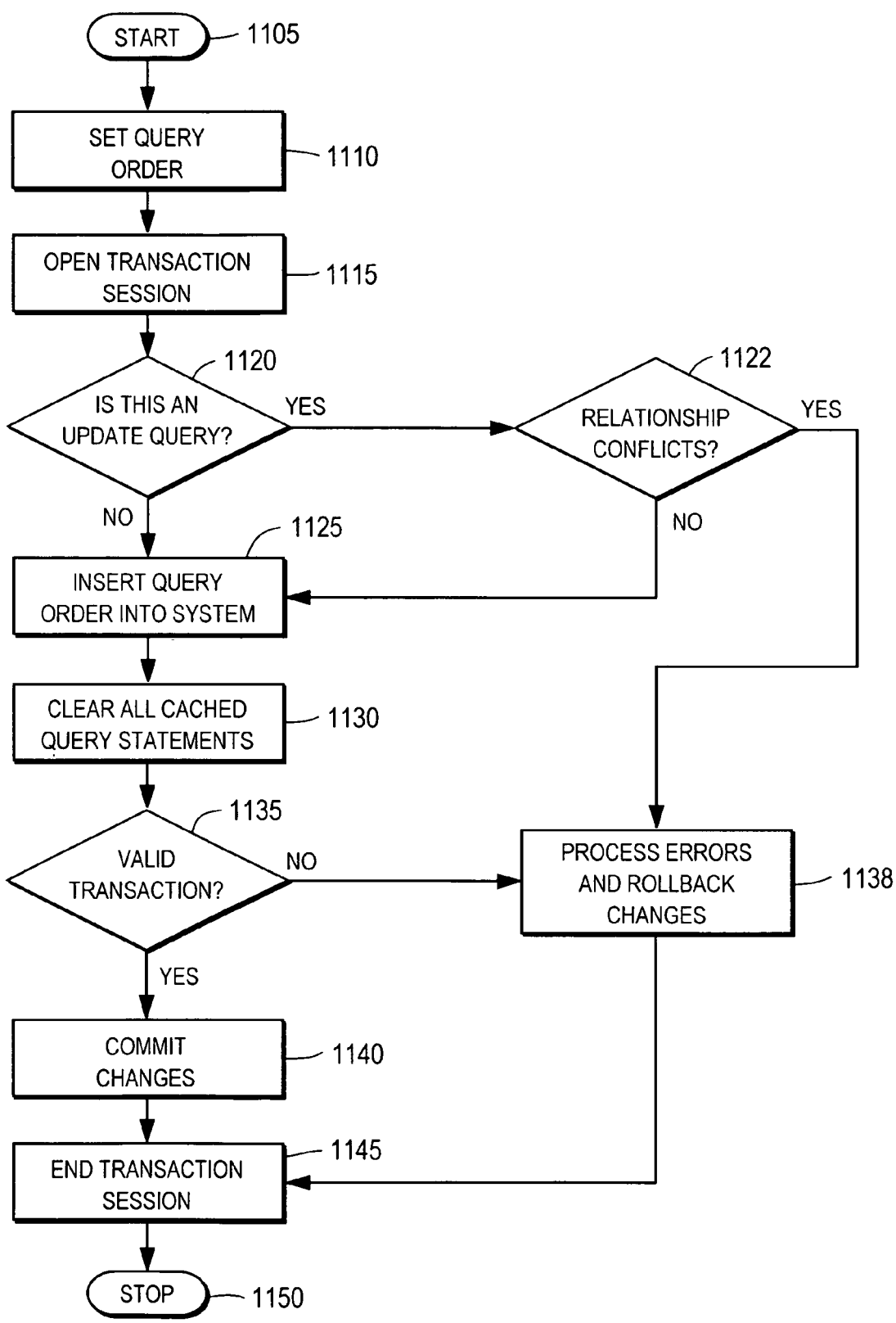
FIG. 11 is a flow diagram illustrating one example of the attribute and relationship ordering process for output and update queries.

FIG. 11 is a flow diagram illustrating one example of the attribute and relationship ordering process for output and update queries. The process starts at block 1105. At block 1110, a query order transaction is received. One example of a method of specifying query order is through a Server Administration GUI. The user selects either the base or any related set that is included in the query's attribute bundle. The user then specifies attributes by which to order records that are returned from the selected set. The user can also specify which attributes and relationships will appear, and in which order, for a data view. Two possible examples of data views are the summary view (used to retrieve multiple records) and the detail view (used to retrieve a single record).

At block 1115, a transaction session is opened to manage errors and to batch changes to the database resulting from execution of various tasks in the process. At block 1120, a determination is performed to verify that the transaction is an update query. If it is an update query, the process flows to block 1122 where another determination is performed to verify whether or not there is any relationship conflict. If there is a conflict, the process flows to block 1138 to process errors and to rollback changes. From block 1122, if there is no conflict, the process flows to block 1125. From block 1120, if the transaction is not an update query, the process flows to block 1125.

At block 1125, query order records are inserted into the system. At block 1130, all of the cached query statements are cleared for the selected query. At block 1135, a check is performed to determine if the transaction is valid. The transaction is valid if none of the previous operations resulted in an error condition. If the transaction is valid, the process flows to block 1140 where the changes are committed, and the transaction session ends at block 1145. From block 1135, if the transaction is invalid, the process flows to block 1138 where the changes are rolled back and appropriate error handling procedures are processed. The process stops at block 1150.

An output query allows the user to access data. It includes an attribute bundle, conditions and order. When accessing data with an output query, the following features are automatically applied:

Generation of a hierarchical data set (XML or ADO shaped record sets are possible examples) that provides an extremely logical and efficient format for data retrieval.

Flexibility to use stored procedures and in-line SQL in addition to native output queries.

Figure 12:
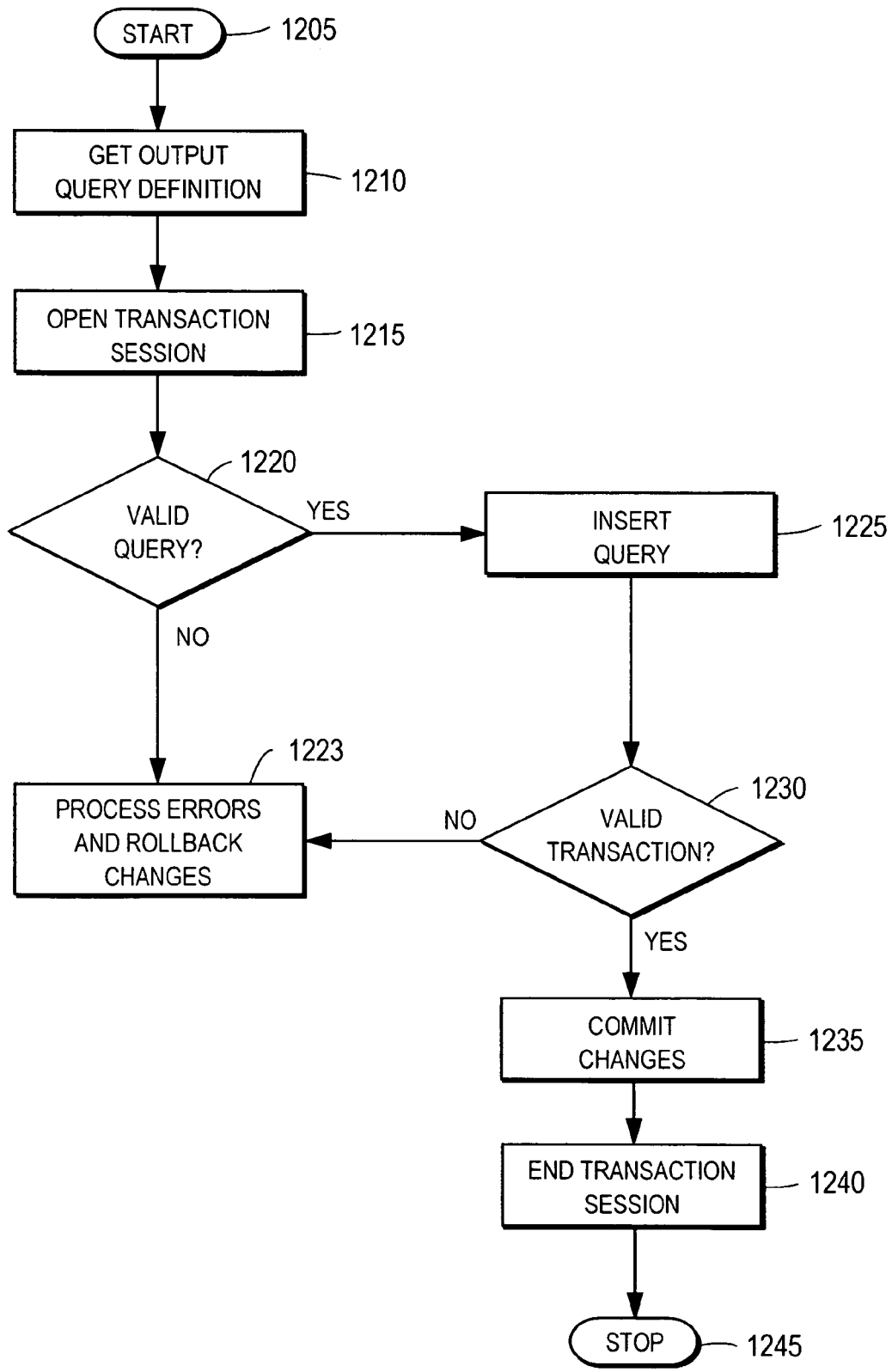
FIG. 12 is a flow diagram illustrating one example of the add output query process.

FIG. 12 is a flow diagram illustrating one example of the add output query process. The process starts at block 1205. At block 1210, the system receives an output query definition, which includes a name for the output query and attribute bundle if applicable. The output query definition is provided by the user when the user selects, for example, and "Add New Output Query" option, "Add New SQL Output Query" option, or "Add New Stored Procedure Output Query" option using a GUI.

At block 1215, a transaction session is opened. The transaction session is used to manage errors and to batch changes to the physical database resulting from execution of various tasks in the process. This provides the ability to automatically rollback changes to the database. For example, when an error occurs during the Add Output Query process, tasks already completed can be reversed or rolled back to a state before any data-manipulation commands were executed.

At block 1220, checking is performed to ensure that the query is valid. This checking may include, but is not limited to, testing the uniqueness of the query name. If the query is invalid, the process flows to block 1223. If the query is valid, the output query definition is inserted into the system, as shown at block 1225. At block 1230, the system checks for any errors that may have occurred during the process. If errors are detected, the flow proceeds to block 1223, where all changes performed during the add output query process are rollbacked, or reversed, and errors and warnings are processed, which may include reporting them to the requesting process or user.

If no error is detected at block 1230, the process flows to block 1235, where the changes are committed, or finalized. At block 1240, the transaction session is closed. The process stops at block 1245.

XIV. Workflow

The system allows the user to define custom workflow stages that are dynamically generated from the database. There is no limit to the number of workflow stages that can be created. In addition, the user is able to create a custom label for the workflow stages. Workflow Stages allow users to define one or more operations involved in manipulating an asset. Each operation includes an association to one or more groups of users who have access to an asset in that workflow stage. Workflow stages may also be associated with business rules, required fields, and hidden fields (each described further below).

Figure 13:
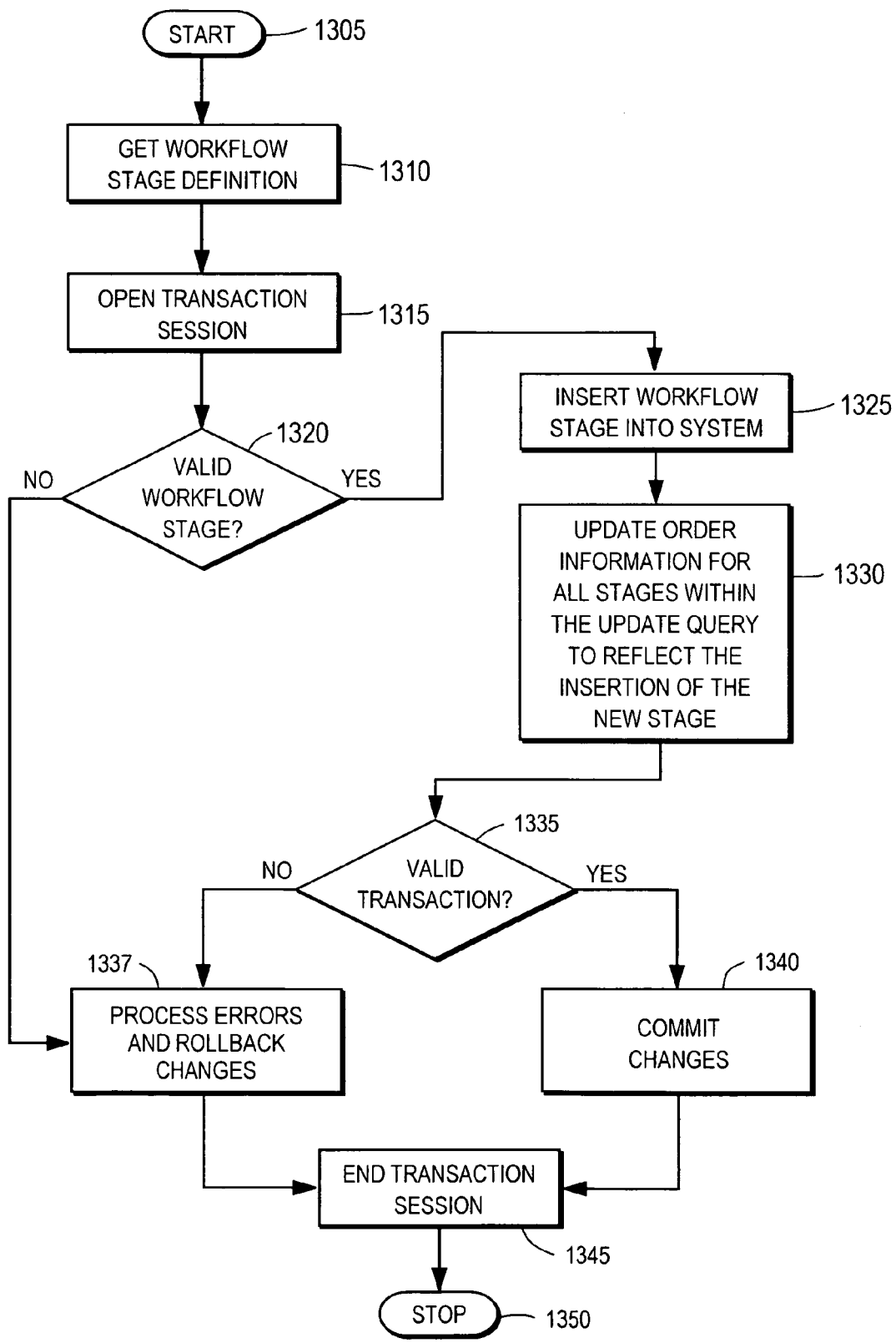
FIG. 13 is s flow diagram illustrating one example of an Add workflow stage process.

FIG. 13 is a flow diagram illustrating one example of an add workflow stage process. The process starts at block 1305. At block 1310, the system receives a workflow stage definition, which includes the stage name, the update query to which it belongs, and its order relative to the other workflow stages associated with the update query.

At block 1315, a transaction session is opened. The transaction session is used to manage errors and to batch changes to the physical database resulting from execution of various tasks in the process. This provides the ability to automatically rollback changes to the database. For example, when an error occurs during the add workflow stage process, tasks already completed can be reversed or rolled back to a state before any data-manipulation commands were executed.

At block 1320, checking is performed to ensure that the workflow stage is valid. If the workflow stage is not valid, the process flows to block 1337. Otherwise, at block 1325, the workflow stage definition is inserted into the system.

At block 1330, other workflow stages belonging to the same update query are updated in the system to reflect their order relative to the newly added workflow stage. At block 1335, the system tests for any errors that may have occurred during the process. If errors are detected, flow proceeds to block 1337, where all changes performed during the add workflow stage process are rollbacked, or reversed, and errors and warnings are processed, which may include reporting them to the requesting process or user. If no errors occurred, the flow continues at block 1340, where the changes are committed, or finalized. At block 1345, the transaction session is closed. The process stops at block 1350.

Figure 14:
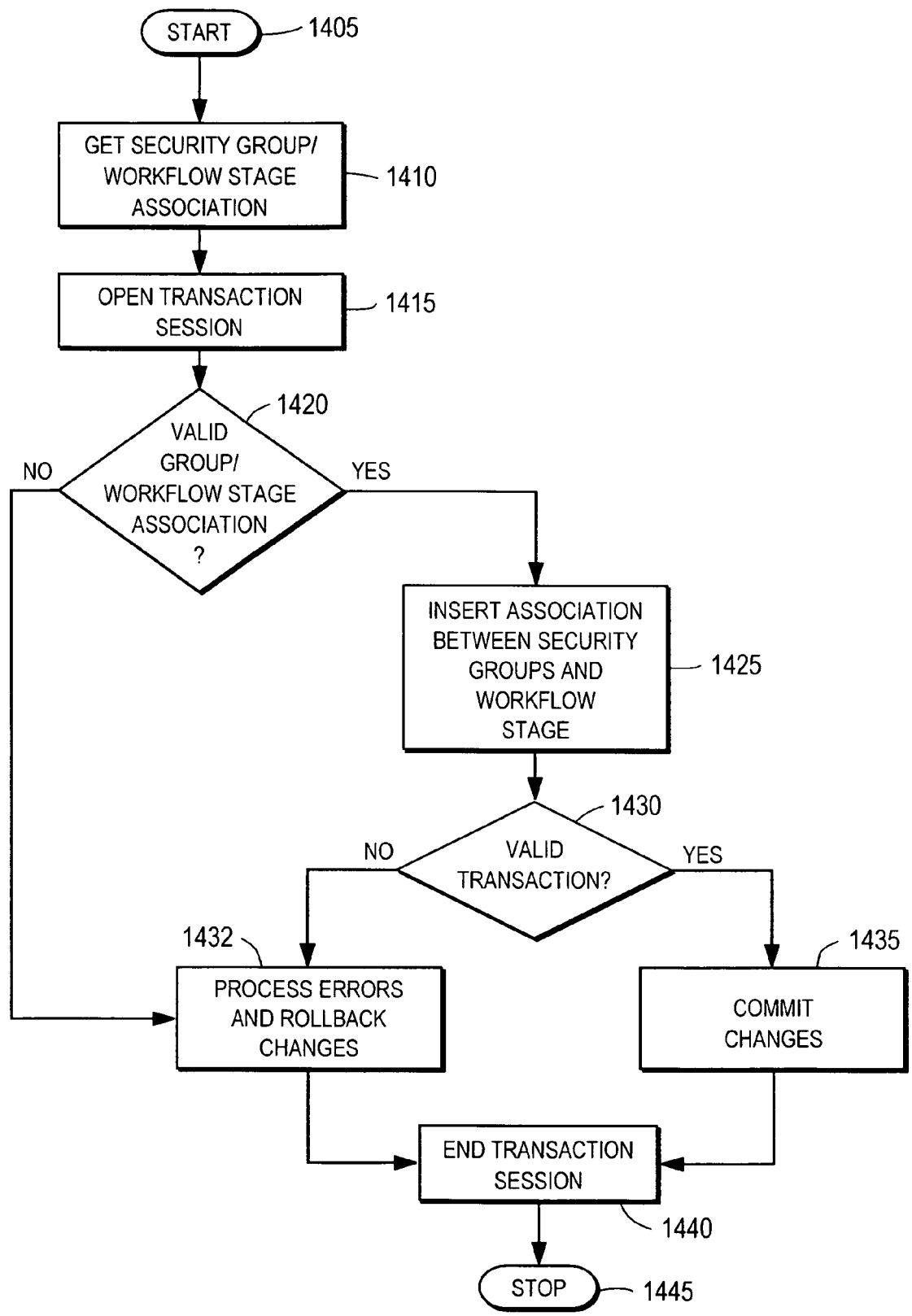
FIG. 14 is a flow diagram illustrating one example of a process used to add a security group to a workflow stage.

FIG. 14 is a flow diagram illustrating one example of a process used to add a security group to a workflow stage. The process starts at block 1405. At block 1410, the system receives a security group/workflow stage association, which includes the workflow stage and one or more security groups to be associated with it.

At block 1415, a transaction session is opened. The transaction session is used to manage errors and to batch changes to the physical database resulting from execution of various tasks in the process. This provides the ability to automatically rollback changes to the database. For example, when an error occurs during the add security group to workflow stage process, tasks already completed can be reversed or rolled back to a state before any data-manipulation commands were executed.

At block 1420, checking is performed to ensure that the association is valid. If it is invalid, the process flows to block 1432 to process error. If it is valid, the process flows to block 1425, where the association is inserted into the system.

At block 1430, the system tests for any errors that may have occurred during the process. If errors are detected, flow proceeds to block 1432, where all changes performed during the add security group to workflow stage process are rollbacked, or reversed, and errors and warnings are processed, which may include reporting them to the requesting process or user. If no errors occurred, the flow continues at block 1435, where the changes are committed, or finalized. At block 1440, the transaction session is closed. The process stops at block 1445.

XV. Business Rules

The validation of an update query's data by a workflow stage that allows or prevents developers from entering information is referred to as a business rule. The business rule feature allows the user to build the business logic and write the error message if the rule is broken. The system automatically creates the code to represent this operation in the SQL code generated by the query. The business rules allow users to define criteria that must be met when manipulating an asset. The criteria may be formulated as an output query that is run at the time the asset is manipulated. Examples of business rule definitions include the following:

an output query defining the criteria;

a choice of which versions of asset data the manipulation should be validated against;

the maximum number of records the output query can return without causing the business rule to be violated;

a choice of whether and when the output query is executed (it will validate only against the asset being manipulated or against all records in the system);

an error message that can be returned to the calling process or user when the business rule is violated; and the workflow stages to which the business rule should be applied.

Figure 15:
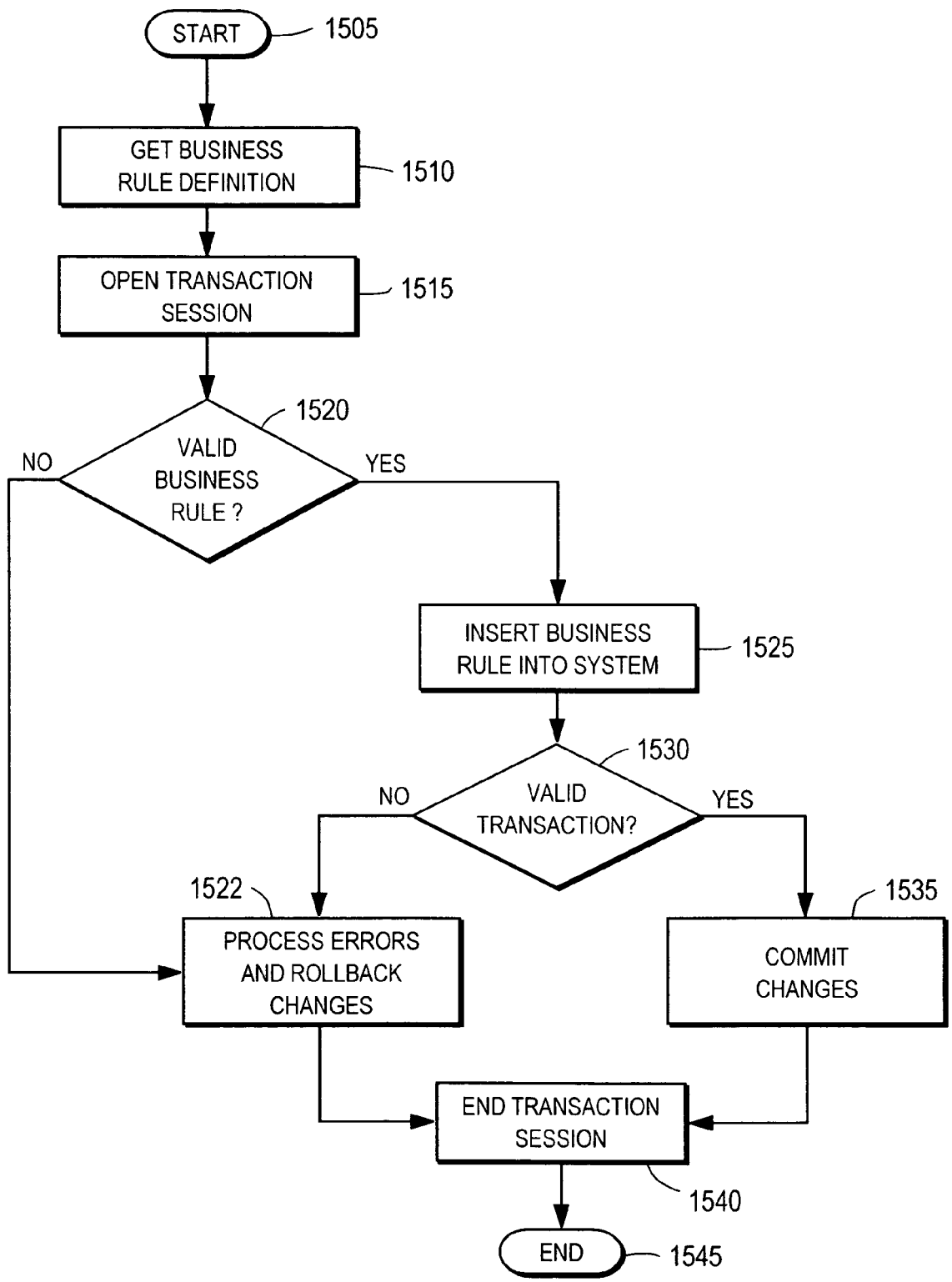
FIG. 15 is a flow diagram illustrating one example of the add business rules process.

FIG. 15 is a flow diagram illustrating one example of the add business rules process. The process starts at block 1505. At block 1510, the system receives a business rule definition, which includes some or all of the information described above.

At block 1515, a transaction session is opened. The transaction session is used to manage errors and to batch changes to the physical database resulting from execution of various tasks in the process. This provides the ability to automatically rollback changes to the database. For example, when an error occurs during the add business rule process, tasks already completed can be reversed or rolled back to a state before any data-manipulation commands were executed.

At block 1520, checking is performed to ensure that the business rule is valid. If it is invalid, errors are processed and changes are reversed, as shown at block 1522. From block 1520, if the business rule is valid, the rule is inserted into the system, as shown at block 1525.

At block 1530, the system tests for any errors that may have occurred during the process. If errors are detected, the process flows to block 1522, where all changes performed during the add business rule process are rollbacked, or reversed, and errors and warnings are processed, which may include reporting them to the requesting process or user. If no errors occurred, the process flows to block 1535, where the changes are committed, or finalized. At block 1540, the transaction session is closed. The process stops at block 1545.

XVI. Working with Fields

The system provides for required and hidden fields. This feature allows developers to specify which (if any) attributes included in an update query should be hidden or required, and in which stage of the workflow. The system automatically creates the code to represent this operation in the SQL code generated by the update query. Required fields allow users to define fields and relationships that must contain data when manipulating an asset. A required field definition may include one or more of the following:

an attribute or relationship to be the required field; and the workflow stages to which the required field should be applied.

Figure 16:
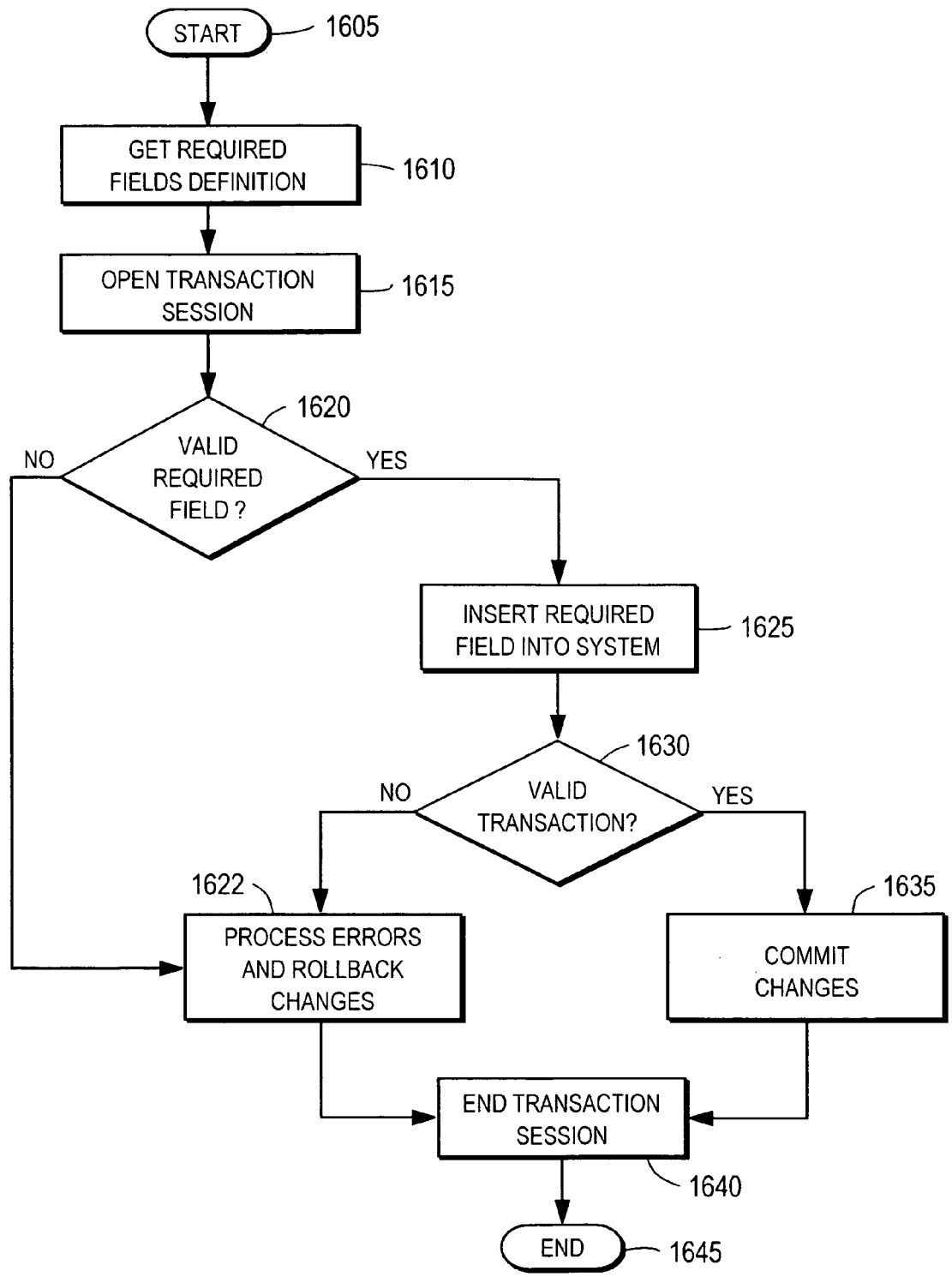
FIG. 16 is a flow diagram illustrating an example of adding required fields.

FIG. 16 is a flow diagram illustrating an example of a process for adding required fields. The process starts at block 1605. At block 1610, the System receives one or more required field definitions, which include some or all of the information described above.

At block 1615, a transaction session is opened. The transaction session is used to manage errors and to batch changes to the physical database resulting from execution of various tasks in the process. This provides the ability to automatically rollback changes to the database. For example, when an error occurs during the add required field process, tasks already completed can be reversed or rolled back to a state before any data-manipulation commands were executed.

At block 1620, checking is performed to ensure that the required field is valid. For example, a field may not be valid as a Required Field if it is also a hidden field in the same workflow stage. If the required field is not valid, the process flows to block 1622 to process errors and rollback changes. If the required field is valid, the process flows to block 1625.

At block 1625, the required field definition is inserted into the system. At block 1630, the system tests for any errors that may have occurred during the process. If errors are detected, flow proceeds to block 1622, where all changes performed during the add required field process are rollbacked, or reversed, and errors and warnings are processed, which may include reporting them to the requesting process or user. If no errors occurred, the flow continues at block 1635, where the changes are committed, or finalized. At block 1640, the transaction session is closed. The process stops at block 1645.

Hidden fields allow users to define fields and relationships that are not viewable and may not be retrieved from the database when manipulating an asset within a particular workflow stage. A hidden field definition may include one or more of the following:

an attribute or relationship to be the hidden field; and the workflow stage(s) to which the hidden field should be applied.

Figure 17:
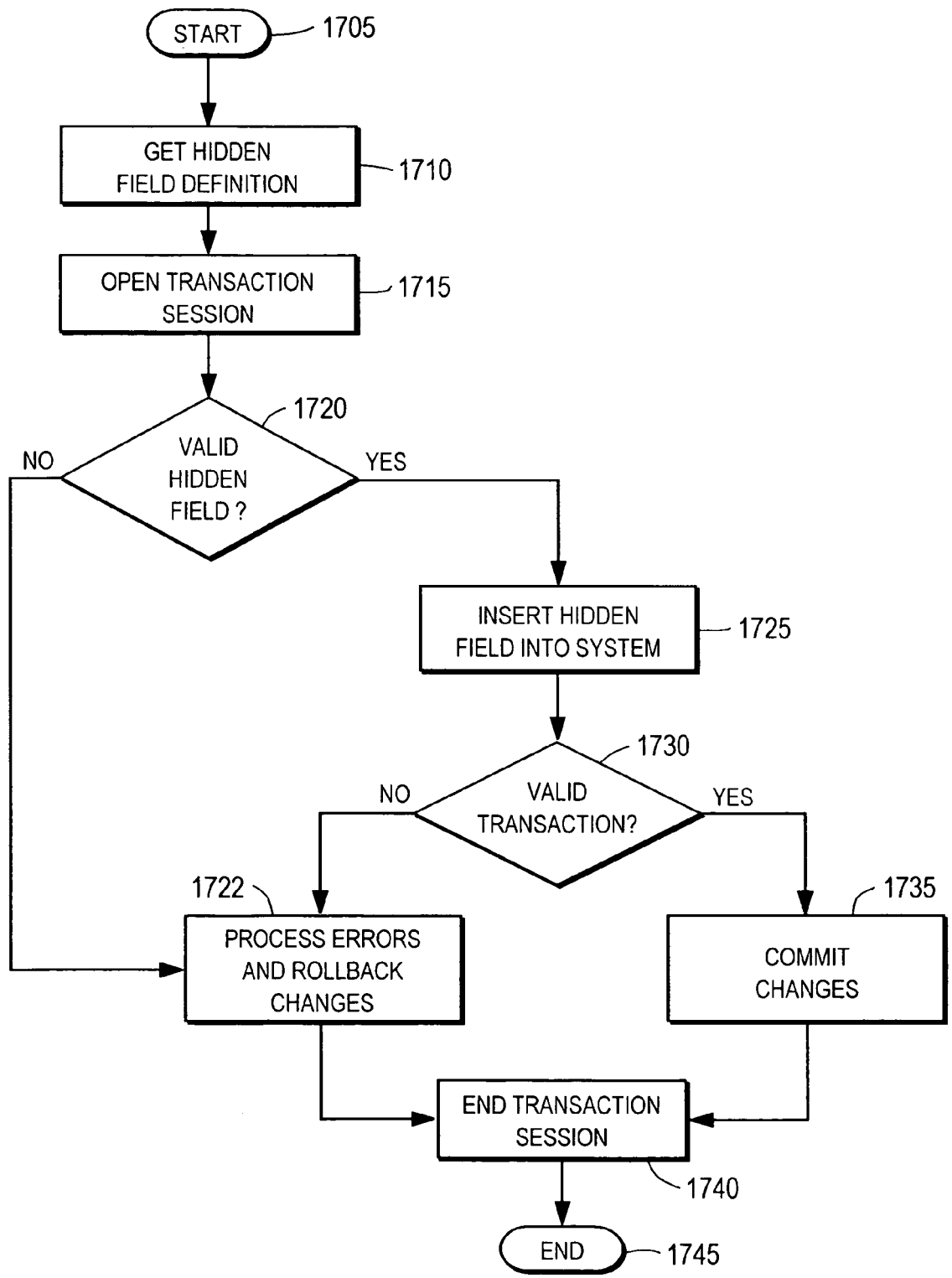
FIG. 17 is a flow diagram illustrating an example of adding hidden fields.

FIG. 17 is a flow diagram illustrating an example of a process for adding hidden fields. The process starts at block 1705. At block 1710, the system receives one or more hidden field definitions, which include some or all of the information described above.

At block 1715, a transaction session is opened. The transaction session is used to manage errors and to batch changes to the physical database resulting from execution of various tasks in the process. This provides the ability to automatically rollback changes to the database. For example, when an error occurs during the add hidden field process, tasks already completed can be reversed or rolled back to a state before any data-manipulation commands were executed.

At block 1720, checking is performed to ensure that the hidden field is valid. For example, a field may not be valid as a hidden field if it is also a required field in the same workflow stage. At block 1725, the hidden field definition is inserted into the system.

At block 1730, the system tests for any errors that may have occurred during the process. If errors are detected, flow proceeds to block 1722, where all changes performed during the add hidden field process are rollbacked, or reversed, and errors and warnings are processed, which may include reporting them to the requesting process or user. If no errors occurred, the flow continues at block 1735, where the changes are committed, or finalized. At block 1740, the transaction session is closed. The process stops at block 1745.

XVI. Working with Queries 2: Update Queries

An update query allows the user to both access and manipulate data. It includes all elements of an output query for accessing data—attribute bundles, conditions, and order—as well as elements useful for manipulating data, including workflows, business rules, required fields, and hidden fields. When manipulating data with an update query, the following features are automatically applied (other data-management issues may also be automatically handled by the system):

Multiple versions of a record can be managed as a single asset—that is, they possess identical AssetIDs.

Simultaneous edits to a single asset by multiple users, or collisions, may be handled.

Edited fields are automatically checked to make sure the data types are valid for the attributes to which they belong.

The "one" end of a one-to-one or one-to-many relationship is enforced, ensuring relational data integrity.

Inheritance is automatically managed, allowing simultaneous, transparent manipulation of several data tables in a single operation.

Each asset manipulation has a corresponding history record, which includes information about which user performed the manipulation, at what date/time it was performed, which workflow stage the asset was associated with as the end result of the manipulation, and which versions of the asset were manipulated.

Figure 18:
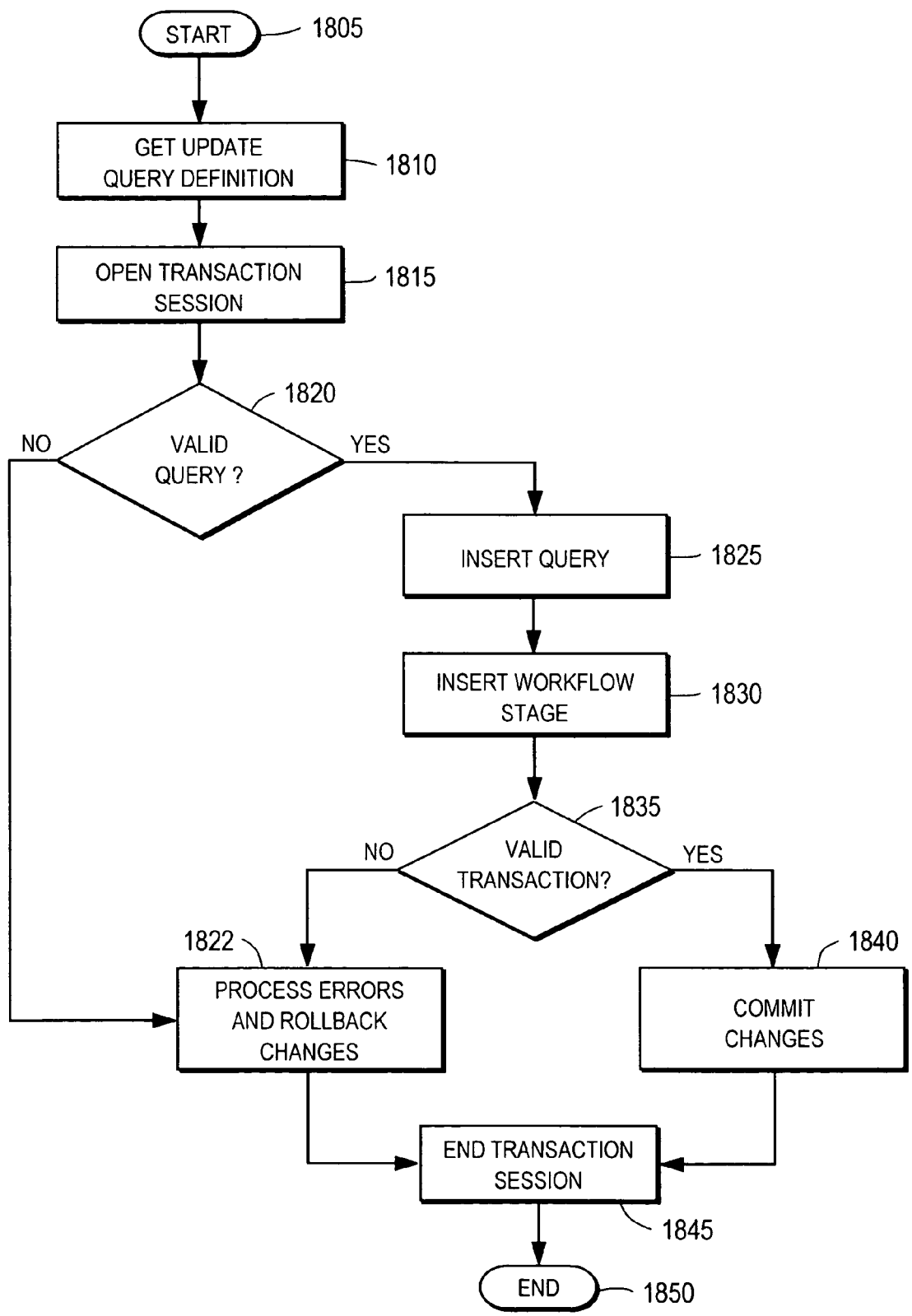
FIG. 18 is a flow diagram illustrating an example of adding update queries.

FIG. 18 is a flow diagram illustrating an example of a process for adding update queries. The process starts at block 1805. At block 1810, the system receives an update query definition, which includes a name for the update query and attribute bundle.

At block 1815, a transaction session is opened. The transaction session is used to manage errors and to batch changes to the physical database resulting from execution of various tasks in the process. This provides the ability to automatically rollback changes to the database. For example, when an error occurs during the add update query process, tasks already completed can be reversed or rolled back to a state before any data-manipulation commands were executed.

At block 1820, checking is performed to ensure that the query is valid. This checking may include, but is not limited to, testing the uniqueness of the query name. If the query is invalid, the process flows to block 1822. If the query is valid, the process flow to block 1825.

At block 1825, the update query definition is inserted into the system. At block 1830, a default workflow stage is inserted into the system. At block 1835, the system tests for any errors that may have occurred during the process. If errors are detected, flow proceeds to block 1822, where all changes performed during the add update query process are rollbacked, or reversed, and errors and warnings are processed, which may include reporting them to the requesting process or user. If no errors occurred, the flow continues at block 1840, where the changes are committed, or finalized. At block 1845, the transaction session is closed. The process stops at block 1850.

When manipulating data with an update query several data-management issues are also automatically handled by the system. These include:

Data requested for editing is returned to the user or requesting process in a representation consistent with the workflow stage in which it currently resides, including hiding any associated hidden fields from the requester.

Multiple versions of a record can be managed as a single asset that is they possess identical AssetIDs.

Data requested for editing may be returned with a "check-out" date/time, allowing simultaneous edits to a single asset by multiple users, or collisions, to be handled.

Edited fields are automatically checked to make sure their data type is valid for the attributes to which they belong.

Each edit to an asset can test if required fields contain necessary data and an error may be returned to the user or requesting process if required fields are violated.

The "one" end of a one-to-one or one-to-many relationship is enforced, ensuring relational data integrity.

Relationships of types "inherits" and "inherits multiple" are automatically managed, allowing simultaneous, transparent manipulation of several data tables in a single operation.

XVII Updating the Data

Figure 19A:
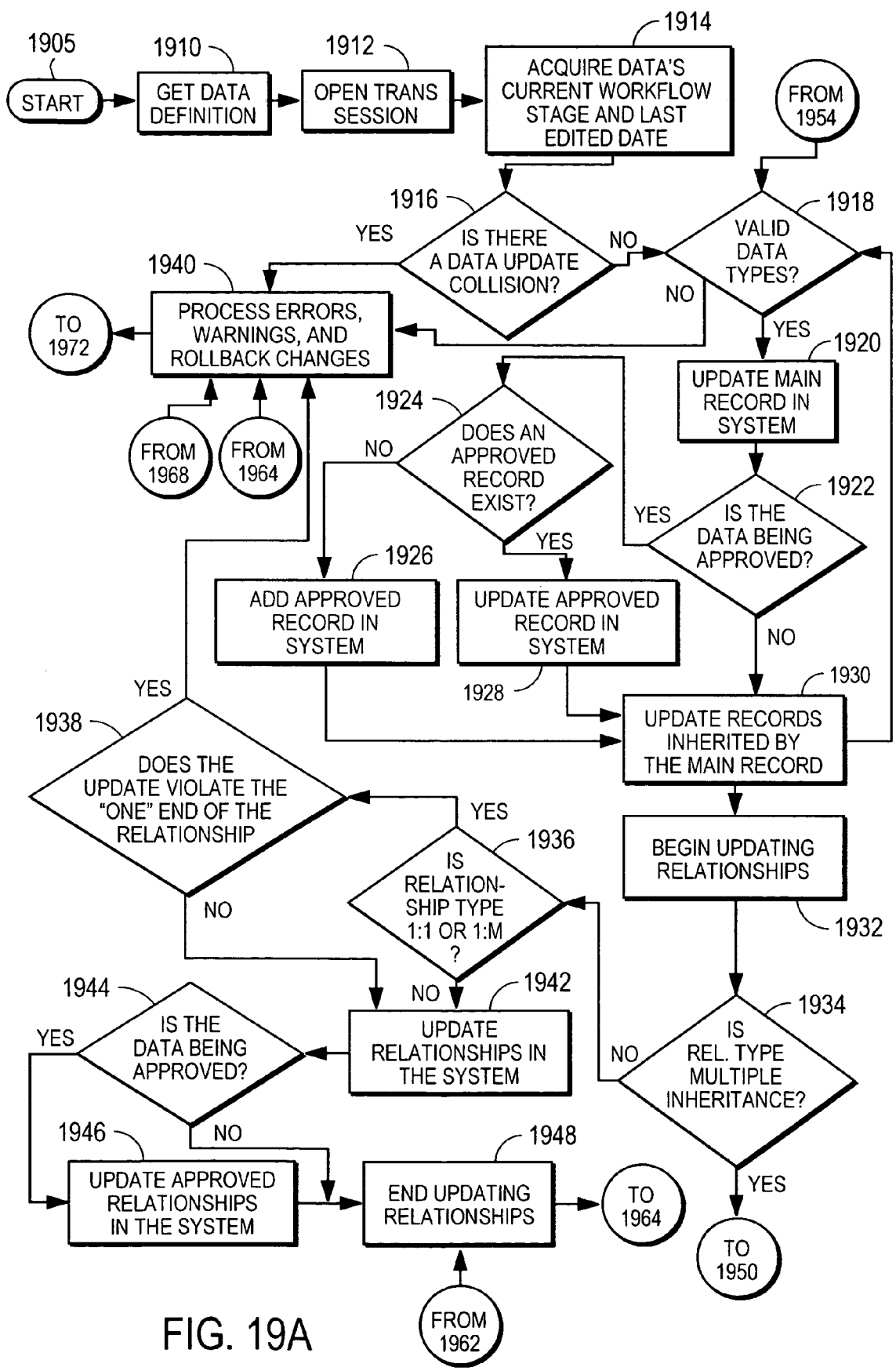
FIGS. 19A & 19B collectively provide a flow diagram illustrating an example of an updated data process according to one embodiment of the present invention.
Figure 19B:
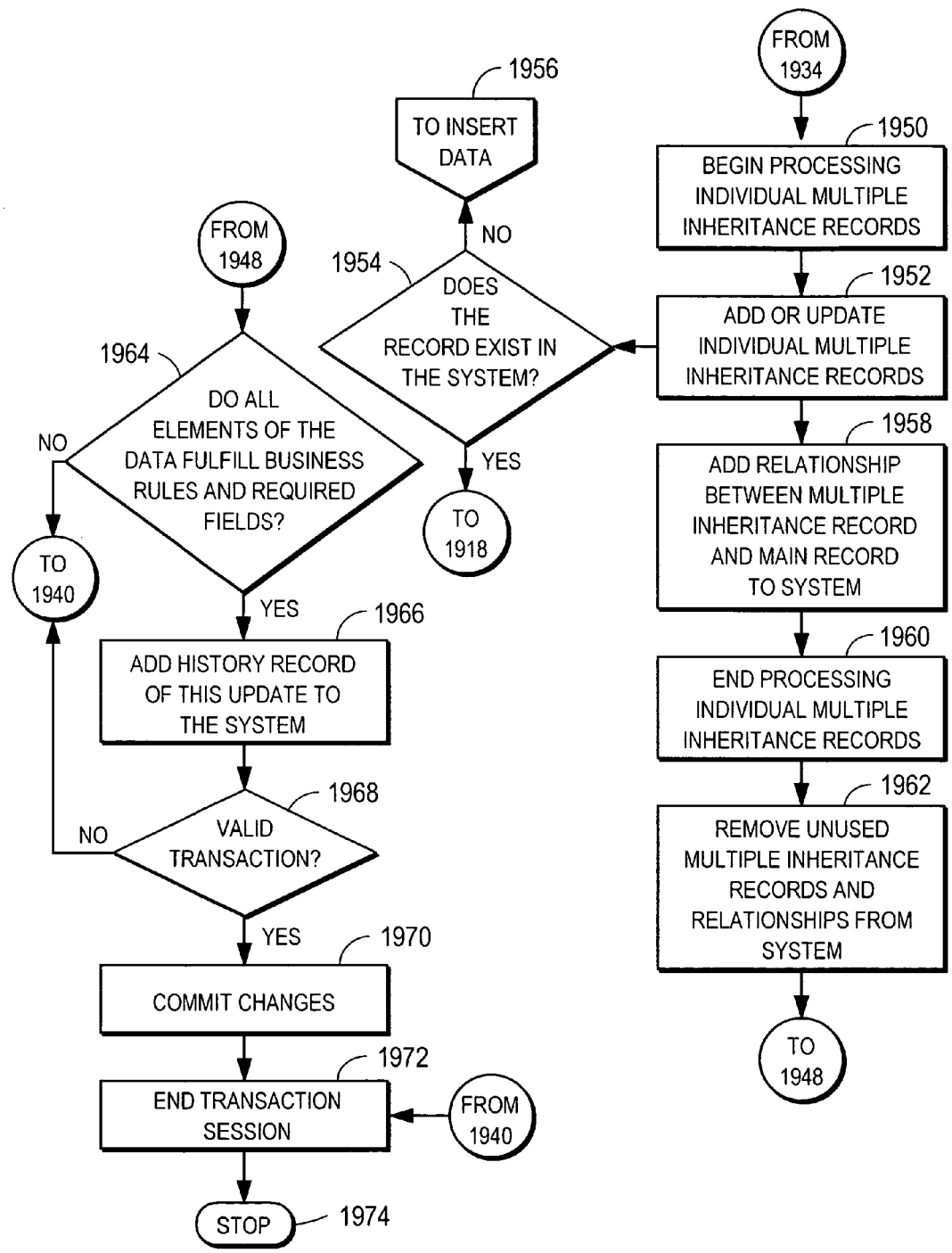

FIGS. 19A & 19B collectively present a flow diagram illustrating an example of an update data process. The process starts at block 1905. At block 1910, the system receives the definition of the data to manipulate. Examples of this information may include:

the data to manipulate, including data instances of attributes and relationships;

the ID of the update query;

the ID of the user performing the manipulation; the workflow stage to associate the asset with upon completion of the manipulation;

the versions of the asset to manipulate, for example, the unapproved and approved versions(The system manages two copies of each record stored in the database, unapproved and approved. The unapproved copy of the record is available for editing in the workflow. Once information moves through the workflow and is approved in the final stage, the system creates a copy of the unapproved record and saves it as the approved record); and the date/time at which the data was "checked-out".

At block 1912, a transaction session is opened. The transaction session is used to manage errors and to batch changes to the physical database resulting from execution of various tasks in the process. This provides the ability to automatically rollback changes to the database. For example, when an error occurs during the update data process, tasks already completed can be reversed or rolled back to a state before any data-manipulation commands were executed.

At block 1914, the system acquires information about the pre-edit stale of the asset, including its associated workflow stage and most recent history entry. At block 1916, the system tests the "check-out" date/time from the data definition against the date/time of the most recent history record for the asset. If the date/time of the history record is more recent, the system determines that a data collision has occurred and the user or requesting process may receive a message indicating that a collision has occurred and the process may be terminated, causing the flow to continue at block 1940. If the "check-out" date/time from the data definition is greater than that of the history record, the flow continues at block 1918.

At block 1918, the system tests to ensure that the data types of all data in the data definition for the main record (the record that is an instance of the attributes from the root set of the update query's attribute bundle) is valid. That is, the system verifies that all data either is, or can be converted to, the data type of its corresponding attribute. If validation fails, the flow continues at block 1940. In this case, the procedures represented by block 1940 may include reporting to the user or requesting process a list of the data fields in violation. From block 1918, if all data types are valid, the flow continues at block 1920, where the main record's data is updated in the system.

At block 1922, the system checks the data definition to see if multiple versions of the asset need to be updated. If more than one version is to be updated, the flow continues at block 1924, otherwise it continues at block 1930.

At block 1924, the system tests the existence of each version of the main record to be updated. If the specific version of the data does not exist, the flow continues at block 1926, where the data for that version is inserted into the system. If the specific version of the data does exist, the flow continues at block 1928, where the data in that version is updated. After blocks 1926 or 1928, the flow continues at block 1930.

At block 1930, the system makes a recursive call to block 1918 to update all inherited records, or records that are instances of all attributes inherited by the root set of the update query's attribute bundle. Recursion allows all inherited records and the records inherited by them, etc., to be updated in the same update data process. When all recursive calls have finished, the flow continues at block 1932.

At block 1932, the system begins the iterative task of updating relationships for each relationship contained in the data definition. In this procedure, at block 1934, the system tests each relationship for being an "inherits multiple" relationship type. If the relationship is not of this type, the flow continues at block 1936; otherwise, the flow continues at block 1950.

At block 1936, the system tests the relationship for being a one-to-one or one-to-many relationship type. If the relationship is of either of these types, the flow continues at block 1938; otherwise, the flow continues at block 1942. At block 1938, the system tests to see if the data definition will violate the "one" end of a relationship by checking the database for existing records relating to the data to be related to. If the "oneness" of the relationship is violated by the data definition, the flow continues at block 1940, which may include returning an appropriate error message to the user or requesting process. If the "oneness" will not be violated by the update, the flow continues at block 1942.

At block 1942, the relationships included in the data definition are updated in the system. At block 1944, the system checks the data definition to see if multiple versions of the asset need to be updated. If more than one version is to be updated, the flow continues at block 1946, otherwise it continues at block 1948. At block 1946, the system updates all other versions of the data relationship instances, as indicated in the data definition. These versions may include, but are not limited to, an approved version. From block 1946, the flow continues at block 1948.

In the cases where the relationship under test at block 1934 is a "inherits multiple" type of relationship, the procedure flows to block 1950. At block 1950, the system begins iterating through individual records associated to the root set though an inherits multiple relationship.

At block 1952, the system begins the process of adding or updating each inherits multiple record. The operations performed at block 1952 are described in blocks 1954 and 1956. At block 1954, the system tests each inherits multiple record for existence in the system. If the record does not exist, the flow continues at block 1956, where the system makes a call to the insert data process to add the inherits multiple record. Otherwise, the system makes a recursive call back to block 1918, where the update process recursively occurs for the inherits multiple record. When all recursive calls have finished, the flow continues at block 1958.

At block 1958, the system adds the relationship instance between the inherits multiple record and the main or inherited record. At block 1960, the system completes its iterations through the inherits multiple records and, at block 1962, the system removes relationship instances between the main and inherited records and inherits multiple records that were not included in the data definition.

From block 1962, the flow continues to block 1948 where, the system completes its iterations through each relationship included in the data definition. From that point, at block 1964, the system tests that all changes included in the update fulfill the required business rules and required fields. If the business requirements are not fulfilled, the flow continues at block 1940, and may include returning to the user or requesting process the error messages defined in the violated business rules and/or a listing of the required fields not fulfilled.

If all business requirements are met, the flow continues at block 1966, where, the system records the history of the manipulation performed. The history may include, but is not limited to, the user performing the manipulation, the date/time at which the manipulation was performed, which workflow stage the asset was associated with as the end result of the manipulation, and which versions of the asset were manipulated. At block 1968, the system tests for any errors that may have occurred during the process. If errors are detected, the flow proceeds to block 1940, where all changes performed during the update data process are rollbacked, or reversed, and errors and warnings are processed, which may include reporting them to the requesting process or user. If no errors occurred, the flow continues at block 1970, where the changes are committed, or finalized. At block 1972, the transaction session is closed. The process stops at block 1974.

XVII. Retreiving Data with Queries

Figure 20:
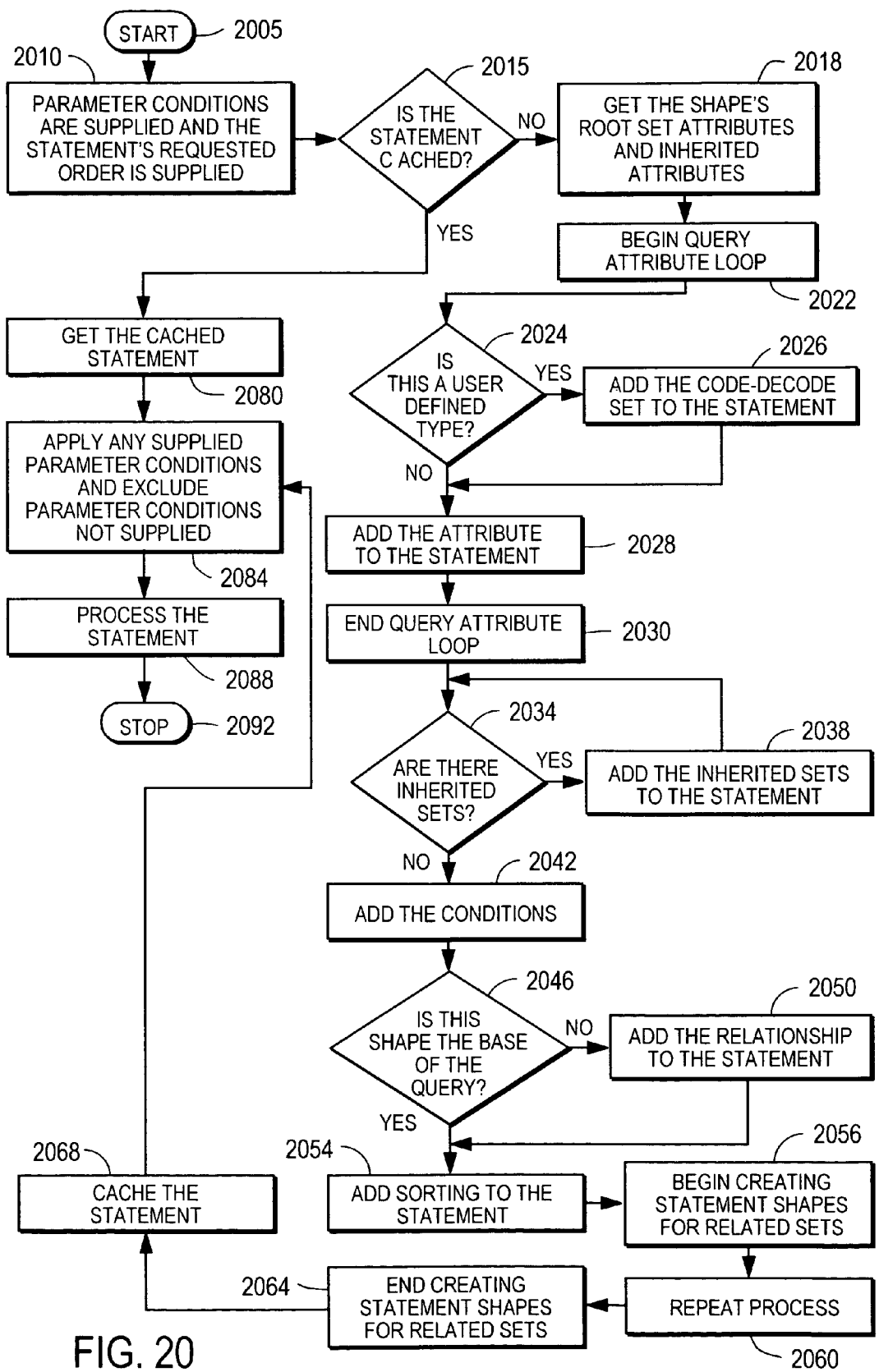
FIG. 20 is a flow diagram illustrating one example of the requesting a queries statement.

FIG. 20 is a flow diagram illustrating one example of the requesting a queries statement. In one embodiment, this statement is an SQL statement that is either taken from a cache or created at run time. The process starts at block 2005. At block 2010, any parameter conditions are supplied to the process, and the order type of the statement is supplied (for example, "Summary Order" or "Detail Order"). The process then flows to block 2015, where a determination is made to see if a cached version of the statement exists. If a cached version of the statement exists, the process flows to block 2080, where the cached statement is retrieved. From there, the process flows to block 2084 (described below)

If a cached version of the statement does not exist, the process flows from block 2015 to block 2018. At block 2018, a recursive process is started. The current shape's root set attributes and inherited attributes used in the order specified (from block 2010) are collected, and the process flows to block 2022. This block starts a loop through the collection of attributes previously collected. At block 2024, a determination is made as to whether the current attribute's data type is a user-defined type. If the attribute is not a user-defined type, the process flows to block 2028. If the attribute is a user-defined type, the process flows to block 2026. At block 2026, the code-decode set (which contains information about user defined types) is added to the statement. In one embodiment, this action would represent adding the table representing the code decode set to the SQL statement's "From" clause, and adding a join to the code -decode table to the "Where" clause. From block 2026, the process flows to block 2028.

At block 2028, the specific attribute is added to the statement. In one embodiment, this is equivalent to adding a column name to the "Select" clause of a SQL statement.

From block 2028, the process flows to block 2030. Although not shown in detail, from this point if there are more attributes in the collection of attributes, the process flows back to block 2022. If there are no more attributes, the process flows to block 2034.

At block 2034, another recursive process begins with a determination as to whether the root set has an "inherits" relationship to other sets. If an inheritance relationships exist, the process flows to 2038, otherwise the process flows to block 2042. At block 2038, the inherited set is added to the statement. In one embodiment, this is the equivalent of adding the inherited set's table to the "From" clause of the SQL statement and adding a join between the inherited set and the current set in the "Where" clause of the SQL statement. From block 2038, the process flows back to block 2034.

At block 2042, conditions on the query are added to the statement. In one example, the conditions would be added to the "Where" clause of the SQL statement. From block 2042, the process flows to block 2046, where a determination is made to see if the shape is the base of the query. If the current shape is at the root of the query, the process flows to block 2054. However, if the current shape is not at the root of the query, the process flows to block 2050, where the current shape's relationship is added to the statement. In one embodiment, this operation of the process would add the relationship's association table to the "From" clause of the SQL statement and add a join between the relationship's association table and the current root set. From block 2050, the process flows to block 2054.

At block 2054, sorting is added to the statement. In one embodiment, this would involve adding attributes to the "Order By" clause of the SQL statement. The process then flows to block 2056.

At block 2056, a loop begins for all of the sets used in the query related to the root set. From this block, the process flows to block 2060, where the related set is passed to block 2018. After the processing is finished for the related set, the process flows to block 2064. If there are more related sets, the looping continues at block 2056. If there are no more related sets, the process flows to block 2068.

At block 2068, the prepared statement is completed and cached. From this block, the process flows to block 2084. At this block, any parameter conditions that were supplied to the process (in block 2010) are applied. Any parameter conditions that are not supplied are ignored in the statement. In one embodiment, the parameter conditions that are supplied are added into the SQL statement, and the parameter conditions that are not supplied are removed from the SQL statement.

From block 2084, the process flows to block 2088, where the statement is evaluated. In one example, the cached and/or prepared SQL statement with the parameters is evaluated by the database and the resulting output returned to the process. From block 2088, the process flows to block 2092, where the process ends.

XVIII. Application Features of the Application Framework

The developers can create a hierarchical system of navigation structures to include navigation items which are dynamically generated by the system and can be linked to an update query, an output query, or a page (e.g., ASP page, URL, etc.), as described in the data management aspect of the application framework 112. When adding a navigation item, a number of characteristics need to be identified, including name of the navigation item, query vs. non-query based, security restrictions, link and child navigation, etc.

Each navigation item is allowed to have zero or one parent. When a navigation item is not associated to a parent, it is considered to be top-level navigation. Similarly, each navigation item may have zero to many children navigation items. Each navigation item can be associated with a single zone that is a physical environment or location. For example, zones include, but are not limited to websites, intranets, extranets, content management applications, and wireless applications.

The system allows the developer to create navigation items that are dynamically populated by records stored in the database. The developer defines the navigation query (e.g., attribute bundle, sort order and attributes to be displayed, etc.) and the system automatically generates the SQL code to query the database and create the navigation items. The system allows query-based navigation items to pass parameters into the query or page it is linked with. The system allows the developer to generate and store the XML code to represent the navigation structure defined in the system. The system automatically generates the necessary code to manage and display the navigation structure. The system allows the developers to restrict access to individual navigation items by user groups, so that only users that are members of the allowed groups can have accesses to the navigation items.

The content management 855 provides dynamic data management created by linking navigation items to an update query. The content management will automatically apply the presentation templates and the application is dynamically generated from the database and managed by the system. User controls on content entry screen are dynamically generated based on data type. Each attribute in the update query that is selected to be displayed renders dynamically from the database and the appropriate user control is presented based on the data type of the attribute. When the user enters information into the field, the information is also validated for the appropriate characters, number of characters, and/or hidden HTML tags.

A dynamic data-modeling framework and an application framework have been described. The two frameworks may be integrated into a system. The system includes various methods used to define the information model to translate the information model into the physical database and to manage data in the physical database. The operations of these various methods may be implemented by a processing unit in a digital processing system, which executes sequences of computer program instructions which are stored in a memory which may be considered to be a machine-readable storage media. The memory may be random access memory, read only memory, a persistent storage memory, such as mass storage device or any combination of these devices. Execution of the sequences of instructions causes the processing unit to perform operations according to the present invention. The instructions may be loaded into memory of the computer from a storage device or from one or more other digital processing systems (e.g., a server computer system) over a network connection. The instructions may be stored concurrently in several storage devices (e.g., DRAM and a hard disk, such as virtual memory). Consequently, the execution of these instructions may be performed directly by the processing unit.

In other cases, the instructions may not be performed directly or they may not be directly executable by the processing unit. Under these circumstances, the executions may be executed by causing the processor to execute an interpreter that interprets the instructions, or by causing the processor to execute instructions which convert the received instructions to instructions which can be directly executed by the processor. In other embodiments, hard-wired circuitry may be used in place of or in combination with software instructions to implement the present invention. Thus, the present invention is not limited to any specific combination of hardware circuitry and software, nor to any particular source for the instructions executed by the computer or digital processing system.

Although the present invention has been described with reference to specific exemplary embodiments, it will be evident that various modifications and changes may be made to these embodiments without departing from the broader spirit and scope of the invention as set forth in the claims. For example, an information model that does not integrate data from external sources may not require definition of external data sets. Also, for example, this embodiment describes an implementation using a relational database (e.g., SQL Server 2000) as the physical data store, although the system is not limited to relational data stores. Accordingly, the specification and drawings are to be regarded in an illustrative rather than a restrictive sense.

What is claimed is:

1. A computer system for application development, comprising:

a computer-implemented data modeling framework configured to enable an application developer to define a logical data model, to dynamically translate the logical data model into a corresponding physical data model, and to dynamically optimize the corresponding physical data model based on the defined logical data model, wherein changes to the logical data model are automatically adjusted in the physical data model accordingly in response to a command received from the application developer via the computer-implemented data modeling framework without having to invoke another database development framework external to the computer-implemented data modeling framework, such that the physical data model is automatically updated in response to the defined logical data model; and a computer-implemented application framework integrated within the data modeling framework as an integrated development environment (IDE), the application framework configured with application development tools and data management tools to enable the application developer to develop an enterprise application to access one or more databases represented by the physical data model, wherein through the IDE, the computer-implemented application framework is able to access the physical data model while the computer-implemented data modeling framework is able to substantially concurrently access the physical data model through the logical data model, wherein updated features represented by the updated physical data model are automatically available to the application developer via the computer-implemented application framework, and wherein the enterprise application being developed using the computer-implemented application framework automatically reflects the updated features.

2. The computer system of claim 1, wherein the enterprise application is a Web application used by a law firm, wherein the Web application comprises a first field for displaying information regarding one or more attorneys of the law firm, and a second field for displaying information regarding the law firm in general, and wherein the information associated with the one or more attorneys and the law firm is stored in the one or more databases represented by the physical data model which is defined and manipulated via the logical data model using the computer-implemented data modeling framework.

3. The computer system of claim 1, wherein the data-modeling framework comprises a graphical user interface (GUI) to define one or more sets of data as a part of the logical data model and transformed into the physical data model, wherein the GUT comprises a table having multiple entries, each entry associated with a set, and each entry of the table comprises:

a first field for display an identifier (ID) of the associated set, including a name of the associated set;

a second field for display one or more attributes of the associated set, when activated, the application developer is able to view the one or more attributes currently associated of the associated set;

a third field for editing one or more existing attributes of the associated set, when activated, the application developer is able to edit the one or more existing attributes of the associated set; and a fourth field for removing the associated set, when activated, the application developer is able to remove the associated set from the one or more databases.

4. The computer system of claim 3, wherein the GUI further comprises a first control, when activated, displays a second GUI page to allow the application developer to add an additional set of data to the table, and wherein the second GUI page comprises a fifth field to specify a name for the additional set and a second control, when activated, causes the additional set of data to be added to the table.

5. The computer system of claim 4, wherein the second control, when activated, further causes a third GUI page to be displayed from the second GUI page to display a summary regarding the additional set, wherein the third GUI page comprises a sixth field to display and edit the name of the additional set, a seventh field to display and edit one or more attributes associated with the additional set, and an eighth field to display and edit a relationship between the additional set and one or more other sets of the table.

6. The computer system of claim 5, wherein the second GUI page further comprises a third control associated with the seventh field, which when activated, causes a third GUI page to be displayed from the second GUI page to add an additional attribute to the additional set summarized in the second GUI page, wherein the third GUI page comprises a ninth field to enter information regarding the additional attribute.

7. The computer system of claim 1, wherein the logical data model includes enhanced representations of data in the physical data model.

8. The computer system of claim 7, wherein the enhanced representations of data in the physical data model includes sets, attributes, relationships among sets, and bi-directional relationships between sets.

9. The computer system of claim 8, wherein the logical data model includes descriptive labeling for the sets, the attributes, and the relationships among sets, and wherein the data modeling framework is configured such that changes to the descriptive labeling do not affect the physical data model.

10. The computer system of claim 7, wherein the relationships among sets include one-to-one relationship, one-to-many relationship, many-to-one relationship, many-to-many relationship, inherits relationship, and inherits-many relationship.

11. The computer system of claim 8, wherein the sets include external data sets representing data from external data sources.

12. The computer system of claim 8, wherein each of the sets represents at least a table in the physical data model.

13. The computer system of claim 7, wherein the enhanced representations of the data are available to the application framework to enable the user to develop applications using the physical data model.

14. The computer system of claim 1, wherein the application framework is accessible through a graphical user interface (GUI).

15. The computer system of claim 1, wherein the application framework is accessible through an application-programming interface (API).

16. The computer system of claim 1, wherein the application framework is accessible through a combination of a graphical user interface (GUI) and an application-programming interface (API).

17. The computer system of claim 1, wherein the application development tools include tools to develop a dynamic content management interface.

18. The computer system of claim 17, wherein the dynamic content management interface includes presentation templates to display data in the physical data model.

19. The computer system of claim 1, wherein the application development tools include tools to develop navigation structures.

20. The computer system of claim 1, wherein the data management tools include tools to develop business rules, workflows, and queries.

21. The computer system of claim 20, wherein the queries include update queries and output queries.

22. A method, comprising:
defining a logical data model using a data modeling framework accessible through a graphical user interface (GUI) configured to dynamically translate the logical data model into a corresponding physical data model and to dynamically optimize the corresponding physical data model based on the defined logical data model, such that changes to the logical data model are automatically and automatically reflected in the physical data model, in response to a command received from an application developer via the data modeling framework without having to invoke another database development framework external to the data modeling framework, such that the physical data model is automatically updated in response to the defined logical data model; and
managing the physical data model using an application framework integrated within the data modeling framework as an integrated development environment (IDE) and accessible through the GUI, the application framework including data management tools and application development tools, each configured to allow presentation and management of the physical data model, wherein the application framework is configured to enable the application developer to develop an enterprise application to access one or more databases represented by the physical data model, wherein through the IDE, the application framework is able to access the physical data model while the data modeling framework is able to substantially concurrently access the physical data model through the logical data model, wherein updated features represented by the updated physical data model are automatically available to the application developer via the application framework, and wherein the enterprise application being developed using the application framework automatically reflects the updated features.

23. The method of claim 22, wherein when the logical data model is changed, the application development tools in the application framework automatically adjust to reflect changes in the logical data model.

24. The method of claim 23, wherein when the logical data model is changed, database rules are enforced by the data modeling framework.

25. The method of claim 22, wherein representation of data in the logical data model includes corresponding representation of data in the physical data model plus enhanced representation of data in the physical data model.

26. The method of claim 25, wherein the enhanced representation of the data in the physical data model includes sets, attributes, relationship among the sets, bi-directional relationship between the sets, and descriptive labeling for each enhanced representation.

27. The method of claim 26, wherein changes to the descriptive labeling do not affect the physical data model.

28. The method of claim 26, wherein the sets include external data sets representing data from external data sources.

29. The method of claim 26, wherein each of the sets represents at least a table in the physical data model.

30. The method of claim 25, wherein the enhanced representation of the data is available to the application framework to manage the physical data model.

31. The method of claim 22, wherein the application development tools include content screens.

32. The method of claim 31, wherein the application development tools further include navigation tools to define navigation items and structures.

33. The method of claim 22, wherein the data management tools include tools to define business rules, workflow, and queries.

34. The method of claim 33, wherein the queries include update queries and output queries.

35. A computer readable medium having stored thereon sequences of instructions which are executable by a system, and which, when executed by the system, cause the system to perform a method, comprising:
defining a logical data model in response to user input received through a graphical user interface (GUI) presented to the user and using a data modeling framework configured to dynamically translate the logical data model into a corresponding physical data model and to dynamically optimize the corresponding physical data model based on the defined logical data model, such that changes to the logical data model are automatically and automatically reflected in the physical data model, the logical data model including enhanced representations of data in the physical data model, in response to a command received from an application developer via the data modeling framework without having to invoke another database development framework external to the data modeling framework, such that the physical data model is automatically updated in response to the defined logical data model; and
managing the physical data model using an application framework included within the data modeling framework as an integrated development environment (IDE) and in response to additional user input received through the graphical user interface, the application framework configured to allow presentation and management of the physical data model, wherein said managing is performed using the enhanced representations of the data in the physical data model, wherein the application framework is configured to enable the application developer to develop an enterprise application to access one or more databases represented by the physical data model, wherein through the IDE, the application framework is able to access the physical data model while the data modeling framework is able to substantially concurrently access the physical data model through the logical data model, wherein updated features represented by the updated physical data model are automatically available to the application developer via the application framework, and wherein the enterprise application being developed using the application framework automatically reflects the updated features.

36. The computer readable medium of claim 35, wherein when the logical data model is changed, the application framework automatically adjusts to reflect changes in the logical data model.

37. The computer readable medium of claim 35, wherein changes to the logical data model are automatically enforced by database rules.

38. The computer readable medium of claim 35, wherein the enhanced representations of the data includes bi-directional relationships between sets in the logical data model, wherein each set corresponds to a table in the physical data model.

39. The computer readable medium of claim 35, wherein the application framework includes content screens, navigation tools, and data management tools.

40. The computer readable medium of claim 39, wherein the data management tools include tools to define business rules, workflow, and queries.

41. The system of claim 1, wherein the data management tools include tool to automatically generate queries to (i) access data from the physical data model, or (ii) update data in the physical data model.

42. The system of claim 41, wherein the queries comprise logical representation of structured query language (SQL) code.

43. The system of claim 42, wherein the SQL code is dynamically generated and cached in the physical data model.

44. The system of claim 1, wherein the data management tools comprise a series of graphical user interfaces adapted to permit the user to construct query statements.

* * * * *